United States Patent
Beeson et al.

(10) Patent No.: US 7,370,993 B2
(45) Date of Patent: *May 13, 2008

(54) LIGHT RECYCLING ILLUMINATION SYSTEMS HAVING RESTRICTED ANGULAR OUTPUT

(75) Inventors: Karl W. Beeson, Princeton, NJ (US); Scott M. Zimmerman, Baskin Ridge, NJ (US)

(73) Assignee: Goldeneye, Inc., San Diego, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/952,230

(22) Filed: Sep. 28, 2004

(65) Prior Publication Data

US 2006/0067078 A1    Mar. 30, 2006

(51) Int. Cl.
*F21V 13/04* (2006.01)
*F21V 7/04* (2006.01)
*F21V 5/00* (2006.01)

(52) U.S. Cl. ............... 362/327; 362/299; 362/308; 362/310; 362/329

(58) Field of Classification Search ........... 362/327, 362/293, 330, 339, 299, 301, 308, 309, 310, 362/328, 329, 800; 257/98
See application file for complete search history.

(56) References Cited

U.S. PATENT DOCUMENTS 5,162,878 A * 11/1992 Sasagawa et al. ............ 257/98
5,410,454 A    4/1995 Murase et al.
5,418,700 A * 5/1995 Demeritt et al. ............ 362/310
5,519,513 A * 5/1996 Copenhaver et al. ....... 362/310
5,544,019 A * 8/1996 Tatavoosian et al. ....... 362/339
5,813,753 A * 9/1998 Vriens et al. ............... 362/293
6,144,536 A    11/2000 Zimmerman et al.
6,177,761 B1 * 1/2001 Pelka et al. ................. 313/512
6,185,357 B1    2/2001 Zou et al.
6,186,649 B1    2/2001 Zou et al.
6,550,942 B1    4/2003 Zou et al.
6,869,206 B2 * 3/2005 Zimmerman et al. ....... 362/329
7,222,993 B2 * 5/2007 Kikuchi et al. ............. 362/300
2001/0013924 A1 * 8/2001 Yokoyama et al. .......... 353/52
2004/0196667 A1 * 10/2004 Lea ............................ 362/583
2004/0263061 A1 * 12/2004 Ishikawa et al. ............ 313/501

* cited by examiner

Primary Examiner—Alan Cariaso
(74) Attorney, Agent, or Firm—William Propp

(57) ABSTRACT

This invention is an illumination system that incorporates a light emitting diode and a partially reflecting optical element. The light emitting diode emits internally generated light having a first angular range and reflects incident light with high reflectivity. The partially reflecting optical element transmits a first portion of the internally generated light with a second angular range, smaller than the first angular range, and reflects a second portion of the internally generated light back to the light emitting diode, where the second portion is reflected by the light emitting diode. The partially reflecting optical element can be a pyramid, an array of pyramids, a first and second orthogonal arrays of prisms or a bandpass filter. Utilizing a partially reflecting optical element and light recycling can increase the effective brightness and the output efficiency of the illumination system.

10 Claims, 22 Drawing Sheets

LIGHT RECYCLING ILLUMINATION SYSTEMS HAVING RESTRICTED ANGULAR OUTPUT

CROSS REFERENCES TO RELATED APPLICATIONS

This application is related to U.S. Pat. No. 6,869,206 entitled "ILLUMINATION SYSTEMS UTILIZING HIGHLY REFLECTIVE LIGHT EMITTING DIODES AND LIGHT RECYCLING TO ENHANCE BRIGHTNESS," to U.S. Pat. No. 6,960,872 entitled "ILLUMINATION SYSTEMS UTILIZING LIGHT EMITTING DIODES AND LIGHT RECYCLING TO ENHANCE OUTPUT RADIANCE" and to U.S. Pat. No. 7,040,774 entitled "ILLUMINATION SYSTEMS UTILIZING MULTIPLE WAVELENGTH LIGHT RECYCLING," all of which are herein incorporated by reference.

This application is also related to U.S. patent application Ser. No. 10/952,112 entitled "LIGHT EMITTING DIODES EXHIBITING BOTH HIGH REFLECTIVITY AND HIGH LIGHT EXTRACTION," U.S. patent application Ser. No. 10/977,923 entitled "HIGH BRIGHTNESS LIGHT EMITTING DIODE LIGHT SOURCE" and U.S. patent application Ser. No. 10/952,229 entitled "LIGHT RECYCLING ILLUMINATION SYSTEMS UTILIZING LIGHT EMITTING DIODES," all of which are filed concurrently with this application and are herein incorporated by reference.

TECHNICAL FIELD

The present invention relates to illumination systems incorporating light emitting diodes and utilizing light recycling.

BACKGROUND

Illumination systems that contain blackbody light sources such as arc lamp sources or incandescent sources are usually designed so that no light is reflected or recycled back to the source. Blackbody light sources are excellent light absorbers and poor light reflectors. Any emitted light that does get back to the source is absorbed and lost, lowering the overall efficiency of the illumination system.

Certain types of light sources, such as some fluorescent light sources and some light emitting diodes (LEDs), can reflect light as well as emit light. Reflecting light sources can be used in illumination systems that recycle light back to the source. Recycled light that is returned to the source and that is subsequently reflected by the source can increase the effective brightness of the source. In addition, light sources that can reflect light instead of absorbing light can reduce absorption losses and increase the overall output efficiency of illumination systems.

The technical term brightness can be defined either in radiometric units or photometric units. In the radiometric system of units, the unit of light flux or radiant flux is expressed in watts and the unit for brightness is called radiance, which is defined as watts per square meter per steradian (where steradian is the unit of solid angle). The human eye, however, is more sensitive to some wavelengths of light (for example, green light) than it is to other wavelengths (for example, blue or red light). The photometric system is designed to take the human eye response into account and therefore brightness in the photometric system is brightness as observed by the human eye. In the photometric system, the unit of light flux as perceived by the human eye is called luminous flux and is expressed in units of lumens. The unit for brightness is called luminance, which is defined as lumens per square meter per steradian. The human eye is only sensitive to light in the wavelength range from approximately 400 nanometers to approximately 700 nanometers. Light having wavelengths less than about 400 nanometers or greater than about 700 nanometers has zero luminance, irrespective of the radiance values.

U.S. Pat. No. 6,869,206, U.S. Pat. No. 6,960,872 and to U.S. Pat. No. 7,040,774 describe light recycling systems that include light recycling cavities or envelopes that enclose one or more light reflecting LEDs. The light reflecting cavities or envelopes reflect and recycle a portion of the light emitted by the LEDs back to the LEDs. The light recycling cavity or envelope has an output aperture with an area that is smaller than the total emitting area of the enclosed LEDs. In such cases, it is possible for the light exiting the cavity or envelope to be brighter than an equivalent LED measured in the absence of recycling.

The three aforementioned applications disclose light recycling illumination systems that have substantially Lambertian light outputs. The light output distributions of these illumination systems generally extend from approximately −90 degrees to approximately +90 degrees. However, the three aforementioned applications do not disclose optical elements that both recycle light and restrict the angular range of the light output.

In this specification, angular extent is defined by the maximum emitting angles of the source. A planar Lambertian source, for example, emits light of constant brightness from −90 degrees to +90 degrees, where the angle is measured from a line perpendicular to the source. The angular extent of a planar Lambertian source is therefore −90 degrees to +90 degrees.

The angular range is defined in this specification as the angular spread between the points on the light output distribution where the light flux per steradian is one half of the peak flux per steradian. For a Lambertian distribution, the light flux per steradian is one-half of the peak value at −60 degrees and at +60 degrees. For a Lambertian source, the angular range is 120 degrees.

U.S. patent application Ser. No. 10/952,112 entitled "LIGHT EMITTING DIODES EXHIBITING BOTH HIGH REFLECTIVITY AND HIGH LIGHT EXTRACTION," U.S. patent application Ser. No. 10/977,923 entitled "HIGH BRIGHTNESS LIGHT EMITTING DIODE LIGHT SOURCE" and U.S. patent application Ser. No. 10/952,229 entitled "LIGHT RECYCLING ILLUMINATION SYSTEMS UTILIZING LIGHT EMITTING DIODES," disclose illuminations systems that include reflective polarizers or wavelength conversion layers that recycle light. However, the reflective polarizers or wavelength conversion layers do not restrict the angular range of the light output of the illumination systems.

In designing complex optical systems such as projection displays, it is important to try to match the angular light output of the source to the maximum acceptance angles of the remainder of the optical system. For example, some imaging light modulators for projection displays have areas ranging from approximately 150 square millimeters to approximately 520 square millimeters. The imaging light modulators can accept light only for angles between −12 degrees and +12 degrees, for example. For such imaging systems, optimizing the quantity called etendue is important.

When measured in air, a simplified equation for etendue is the product of the area of the light beam times the projected solid angle (measured in steradians) of the light beam. Equation 1 expresses the simplified etendue relationship for an imaging system.

$$\text{Etendue}=(A)(\Omega) \quad \text{[Equation 1]}$$

The quantity A is the area of the light beam and $\Omega$ is the projected solid angle of the light beam. For planar sources, the quantity $\Omega$ can be expressed as $$\Omega = \pi \sin^2(\text{half-angle}). \quad \text{[Equation 2]}$$

The half-angle is one half of the full angle of the light beam. A light beam that has a full angle of 24 degrees (from −12 degrees to +12 degrees) has a half-angle of 12 degrees.

An imaging light modulator that has an area of 250 square millimeters and an acceptance angle of −12 degrees to +12 degrees, for example, has an etendue of approximately 34 $mm^2$-steradians. To effectively utilize the light emitted by the light source, the etendue of the light source for this example should also be approximately 34 $mm^2$-steradians or less. If the output from the light source is Lambertian and extends from −90 degrees to +90 degrees with a range of 120 degrees, the area of the light source should be approximately 11 square millimeters in order for the source to have the same etendue as the imaging light modulator. It is difficult for an LED-based illumination system to have such a small output area and still have sufficient output flux for a large projection display. If the light source output can be restricted to a smaller angular range, however, the source area can be made correspondingly larger.

It would be desirable to design LED light recycling illumination systems that incorporate optical elements that both recycle light and restrict the angular range of the light output. Such systems can have increased output brightness and efficiency compared to systems that do not recycle light. In addition, such systems reduce the etendue of the illumination system output in order to better match the etendue of other optical elements in more complex optical systems such as projection displays.

SUMMARY OF THE INVENTION

One embodiment of this invention is an illumination system that incorporates at least one light emitting diode and a partially reflecting optical element. The light emitting diode emits internally generated light having a first angular range and reflects incident light with high reflectivity. The partially reflecting optical element transmits a first portion of the internally generated light with a second angular range, smaller than the first angular range, and reflects a second portion of the internally generated light back to the light emitting diode. The partially reflecting optical element can be, for example, a pyramid, an array of pyramids, a first and second orthogonal arrays of prisms or an optical bandpass filter.

Another embodiment of this invention is an illumination system that incorporates at least one light emitting diode, a light recycling envelope that encloses the at least one light emitting diode and a partially reflecting optical element. The light emitting diode emits internally generated light and reflects incident light with high reflectivity. The light recycling envelope has inside reflecting surfaces that recycle a part of the internally generated light emitted by the light emitting diode back to the light emitting diode. The light recycling envelope has an output aperture through which light is directed to the partially reflecting optical element. The light exiting the output aperture has a first angular range. The partially reflecting optical element transmits a first portion of the internally generated light with a second angular range, smaller than the first angular range, and reflects a second portion of the internally generated light back into the light recycling envelope and to the light emitting diode.

By utilizing light recycling and a partially reflecting optical element that restricts the angular range of the light output of an illumination system, one can increase the effective brightness and the output efficiency of the illumination system.

BRIEF DESCRIPTION OF THE DRAWINGS

A more detailed understanding of the present invention, as well as other objects and advantages thereof not enumerated herein, will become apparent upon consideration of the following detailed description and accompanying drawings, wherein.

DETAILED DESCRIPTION OF THE PREFERRED EMBODIMENTS

The preferred embodiments of the present invention will be better understood by those skilled in the art by reference to the above figures. The preferred embodiments of this invention illustrated in the figures are not intended to be exhaustive or to limit the invention to the precise form disclosed. The figures are chosen to describe or to best explain the principles of the invention and its applicable and practical use to thereby enable others skilled in the art to best utilize the invention.

An LED of this invention incorporates a multi-layer semiconductor structure that emits light. Inorganic light-emitting diodes can be fabricated from materials containing gallium nitride (GaN), including the materials aluminum gallium nitride (AlGaN) and indium gallium nitride (InGaN). Other appropriate LED materials are aluminum nitride (AlN), aluminum indium gallium phosphide (AlInGaP), gallium arsenide (GaAs), indium gallium arsenide (InGaAs) or indium gallium arsenide phosphide (InGaAsP), for example, but are not limited to such materials. Especially important LEDs for this invention are GaN-based LEDs that emit light in the ultraviolet, blue, cyan and green region of the optical spectrum and AlInGaP LEDs that emit light in the yellow and red regions of the optical spectrum. For simplicity, the detailed descriptions of LEDs given below will focus on GaN-based devices. AlInGaP LEDs have similar structures except that the semiconductor elements are fabricated from AlInGaP instead of GaN.

Figure 1A:
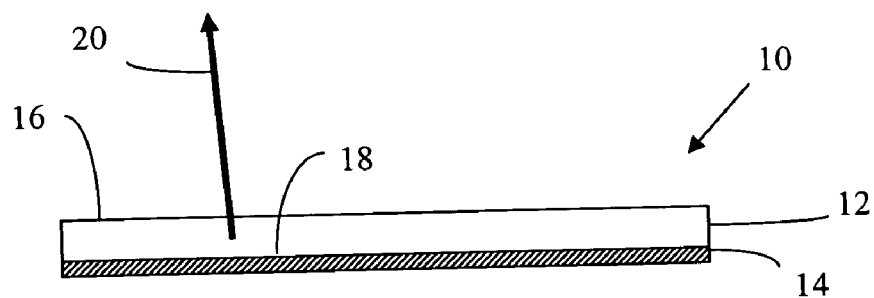
FIG. 1A is a simplified schematic view of the cross-section of a preferred light emitting diode used in this invention.

FIG. 1A is a simplified schematic diagram of the cross-section of LED 10. FIG. 1A is an illustrative example. The LED 10 does not show all the elements of a reflective LED for ease of understanding the present invention in FIG. 2 and the subsequent figures. LED 10 is comprised of a multi-layer semiconductor structure 12 and a reflecting layer 14. Multi-layer semiconductor structure 12 is a simplified representation of a multi-layer group of elements that normally includes at least an n-doped layer, a p-doped layer and an active multi-quantum well structure that emits internally generated light. Multi-layer semiconductor structure 12 has a surface 16 through which the internally generated light 20 exits the multi-layer semiconductor structure. Surface 18 of the multi-layer semiconductor structure 12 is in contact with reflecting layer 14. The multi-layer semiconductor structure is usually not completely transparent and does absorb some of the internally generated light before the light exits LED 10. The absorption coefficient for the multi-layer semiconductor structure 12 for GaN-based LEDs ranges from approximately 10 $cm^{-1}$ to approximately 200 $cm^{-1}$ in the wavelength region from 400-600 nanometers.

Figure 1B:
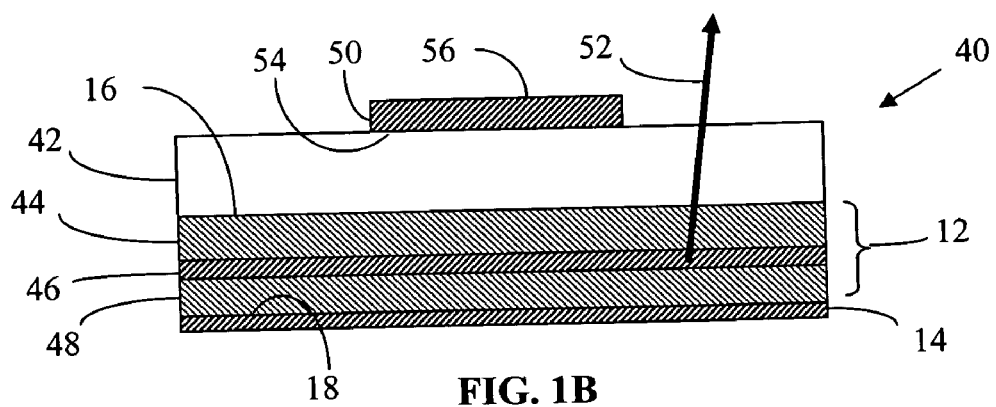
FIGS. 1B-1D are cross-sectional views of example LED structures.
Figure 1C:
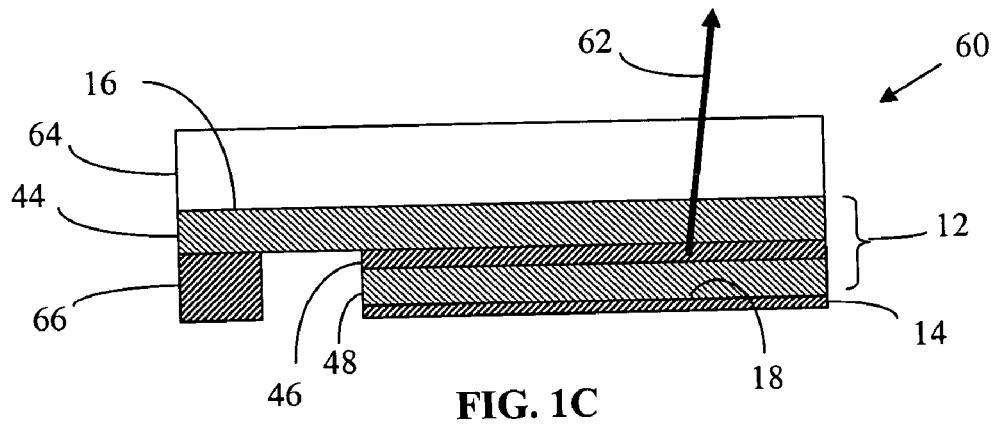
Figure 1D:
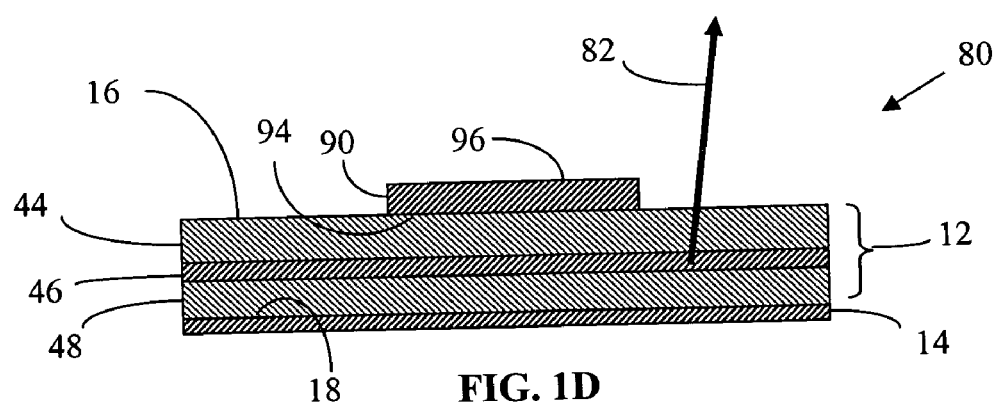

In order to better understand this invention, more detailed schematics of some example LED structures are shown in FIGS. 1B-1D. FIGS. 1B-1D explicitly illustrate example LED electrode structures and some of the elements that comprise the multi-layer semiconductor structure. These examples are for illustrative purposes only and are not meant to limit the scope of this invention to just these examples.

FIG. 1B illustrates the cross-section of LED 40. LED 40 is comprised of reflecting layer 14 that also serves as a bottom electrode, a multi-layer semiconductor structure 12, a substrate 42 and a top electrode 50. The multi-layer semiconductor structure 12 is epitaxially grown onto the substrate 42.

If LED 40 is a GaN LED, the multi-layer semiconductor structure 12 contains at least an n-doped GaN layer 44 that is usually adjacent to the substrate 42, an active layer 46 that emits internally generated light 52 and a p-doped GaN layer 48. The active layer 46 is typically a GaN-based multi-quantum well structure and is located between the n-doped GaN layer 44 and the p-doped GaN layer 48.

The substrate 42 of LED 40 must be at least partially transparent to the internally generated light 52. Substrate 42 must also be electrically conducting in order to form an electrical path between the n-doped layer 44 and the top electrode 50. A typical material for substrate 42 is doped silicon carbide (SiC), but other materials can be used. SiC is partially transparent, but does absorb some of the internally generated light 52. The absorption coefficient of SiC is approximately 2 $cm^{-1}$ in the wavelength region from 400-600 nanometers.

A metallic top electrode 50 is in contact with the electrically conducting substrate 42. The area of the top electrode 50 should be minimized in order for internally generated light 52 to escape from the uncovered area of the multi-layer semiconductor structure 12. The top electrode 50 should have high reflectivity in order to efficiently reflect both internally generated light hitting the bottom surface 54 of the top electrode 50 and incident light hitting the top surface 56 of the top electrode 50. Preferably the reflectivity of top electrode 50 is greater than 70%. More preferably, the reflectivity of the top electrode 50 is greater than 80%. Most preferably, the reflectivity of the top electrode 50 is greater than 90%. Appropriate metals for the top electrode 50 include silver, niobium and aluminum, but are not limited to these materials.

Alternatively, the material for the top electrode 50 can be a transparent conductor. If the material for the top electrode 50 is a transparent conductor, the light transmission of the transparent conductor is preferably greater than 90%. The transparent conductor is transmissive to the wavelengths of light generated by multi-layer semiconductor structure 12 of LED 40. Example transparent conductors include, but are not limited to, indium tin oxide (ITO or $In_2O_3$:Sn), fluorine-doped tin oxide ($SnO_2$:F) and aluminum-doped zinc oxide (ZnO:Al).

FIG. 1C illustrates the cross-section of LED 60. LED 60 is comprised of a reflecting layer 14 that also serves as a first bottom electrode, a multi-layer semiconductor structure 12, a substrate 64 and a second bottom electrode 66. The multi-layer semiconductor structure 12 is epitaxially grown onto the substrate 64.

If LED 60 is a GaN LED, the multi-layer semiconductor structure 12 contains at least an n-doped GaN layer 44 that is usually adjacent to the substrate 64, an active layer 46 that emits internally generated light 62 and a p-doped GaN layer 48. The active layer 46 is typically a GaN-based multi-quantum well structure and is located between the n-doped GaN layer 44 and the p-doped GaN layer 48.

The substrate 64 of LED 60 must be at least partially transparent to the internally generated light 62. In this example substrate 64 does not need to be electrically conductive. A typical material for substrate 64 is sapphire (Al$_2$O$_3$), which is transparent to visible light.

In order to form a second electrode, an etching process removes portions of the reflecting layer 14, the p-doped layer 48 and the active layer 46, thereby exposing a portion of the n-doped layer 44. A second metallic bottom electrode 66 is formed in contact with the exposed n-doped layer 44.

FIG. 1D illustrates the cross-section of LED 80. LED 80 is similar to LED 40 except that LED 80 does not have a partially transparent substrate. LED 80 is comprised of reflecting layer 14 that also serves as a bottom electrode, a multi-layer semiconductor structure 12 and a top electrode 90. The multi-layer semiconductor structure 12 is formed by epitaxially grown onto a substrate, but the substrate is removed before the top electrode 90 is fabricated. For example, if the substrate is sapphire, a laser separation process can be used to remove the substrate from the multi-layer semiconductor structure 12.

If LED 80 is a GaN LED, the multi-layer semiconductor structure 12 contains at least an n-doped GaN layer 44, an active layer 46 that emits internally generated light 82 and a p-doped GaN layer 48. The active layer 46 is typically a GaN-based multi-quantum well structure and is located between the n-doped GaN layer 44 and the p-doped GaN layer 48.

A metallic top electrode 90 is in electrical contact with the n-doped GaN layer 44. The area of the top electrode 90 should be minimized in order for internally generated light to escape from the uncovered area of the multi-layer semiconductor structure 12. The top electrode 90 should have high reflectivity. Preferably the reflectivity of top electrode 90 is greater than 70%. More preferably, the reflectivity of the top electrode 90 is greater than 80%. Most preferably, the reflectivity of the top electrode 90 is greater than 90%. Appropriate metals for the top electrode 90 include, but are not limited to, silver, niobium and aluminum. Alternatively, the material for the top electrode 90 can be a transparent conductor. The materials and characteristics of the top electrode 90 are the same as the materials and characteristics of the top electrode 50 in FIG. 1B.

Returning to FIG. 1A, multi-layer semiconductor structure 12 of LED 10 emits internally generated light 20 through surface 16 and over a first angular range. As stated previously, the angular range is defined as the angular spread between the points on the light output distribution where the light flux per steradian is one half of the peak flux per steradian. For many LEDs, the light output distribution is approximately a Lambertian distribution. For a Lambertian distribution, the light flux per steradian is one-half of the peak value at −60 degrees and at +60 degrees. For such LEDs, the first angular range is 120 degrees or thereabouts.

Reflecting layer 14 reflects both internally generated light and incident light. Reflecting layer 14 can be a specular reflector or a diffuse reflector. Reflecting layer 14 is usually a metal layer. Appropriate metals include, but are not limited to, silver and aluminum. Reflecting layer 14 should have high reflectivity to the internally generated light and to incident light. Preferably the reflectivity of reflecting layer 14 is at least 80%. More preferably the reflectivity is at least 90%. Most preferably, the reflectivity is at least 95%.

LED 10 has a reflectivity to incident light. The reflectivity of LED 10 depends on several factors including the reflectivity of reflecting layer 14, the absorption coefficient of the multi-layer semiconductor structure 12 and the reflectivity of any top electrodes (not shown) that may be present. Preferably the reflectivity of LED 10 to incident light is at least 70%. More preferably, the reflectivity of LED 10 is at least 80%. Most preferably, the reflectivity of LED 10 is at least 90%.

Note that different sub-areas of an LED surface may not have the same reflectivity to incident light. For example, the sub-area of an LED surface covered by electrodes may have a different reflectivity than the sub-area not covered by electrodes. If different sub-areas of an LED surface do not have the same reflectivity, then the reflectivity of the LED is defined in this specification as the weighted average reflectivity for the entire surface of the LED. The weighting function is the fractional portion of the total area of the LED covered by each sub-area.

Light ray 20 illustrates light emitted by LED 10. Multi-layer semiconductor structure 12 emits light ray 20 through surface 16.

Figure 2A:
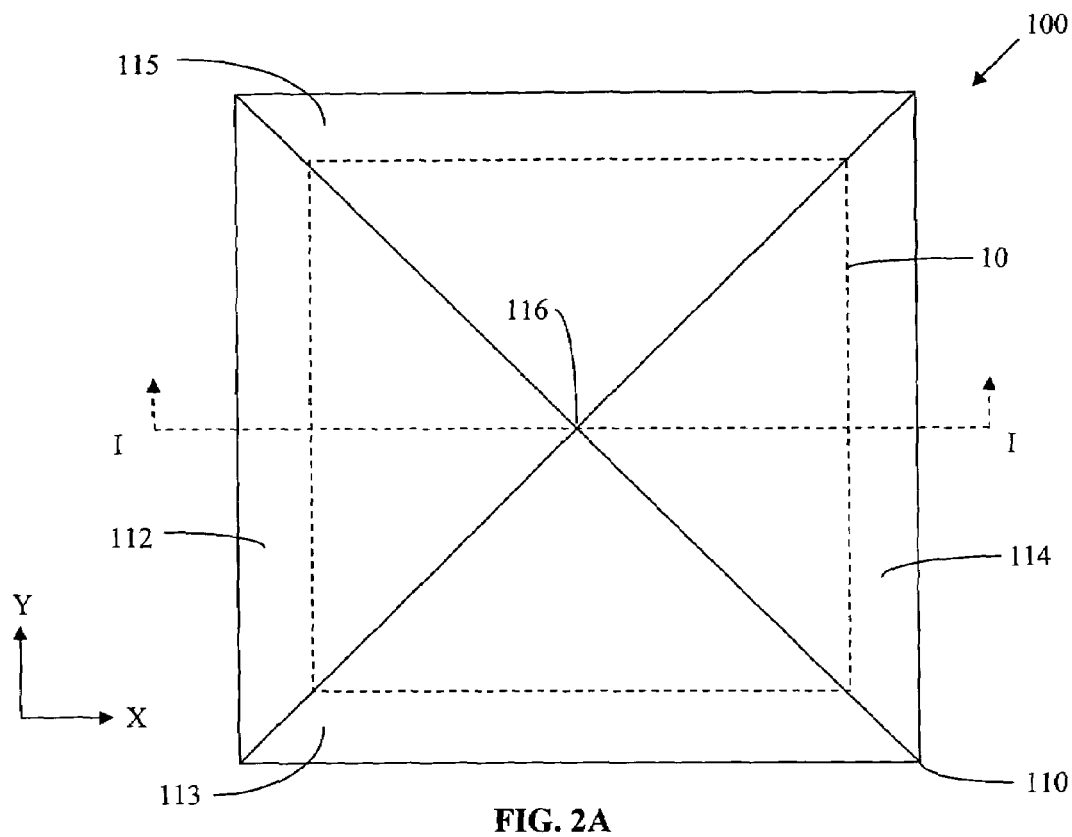
FIG. 2A is a plan view of one embodiment of this invention incorporating a four-sided pyramid.
Figure 2B:
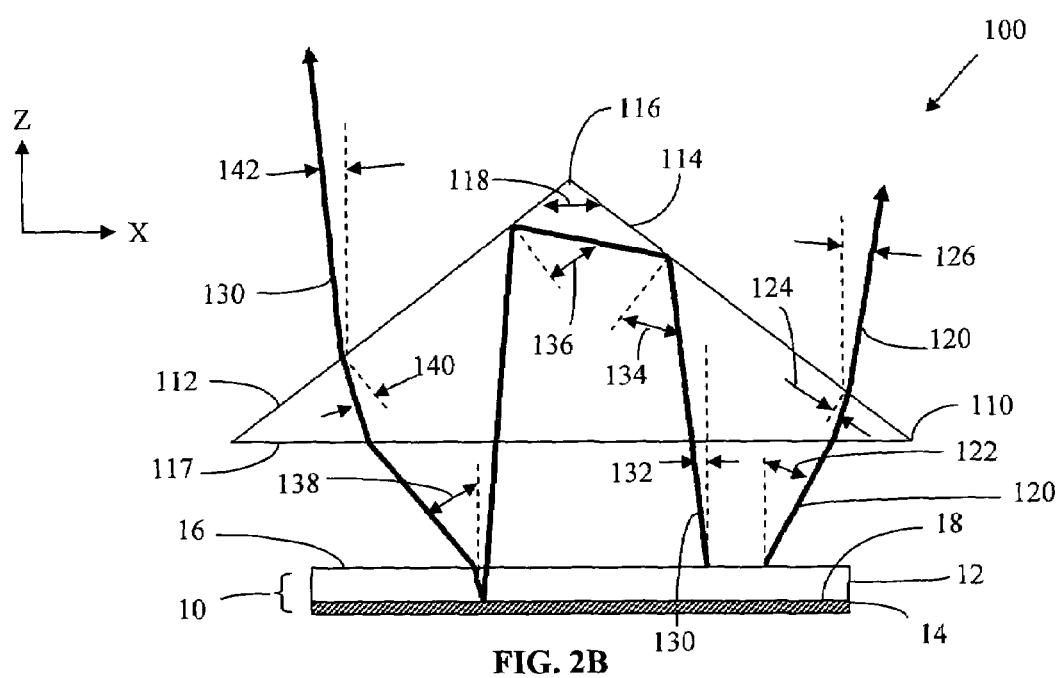
FIG. 2B is a cross-sectional view along the I-I plane illustrated in FIG. 2A.

One embodiment of this invention is illumination system 100 illustrated in FIGS. 2A and 2B. FIG. 2A is a plan view in the X-Y plane of illumination system 100 viewed from above. FIG. 2B is a cross-sectional Z-X view along the I-I plane indicated in FIG. 2A. Illumination system 100 is comprised of LED 10 (illustrated previously in FIG. 1A) and a partially reflecting optical element. In this embodiment, the partially reflecting optical element is pyramid 110.

Pyramid 110 has four connected sides, which are denoted as 112, 113, 114 and 115, and has a base 117. Base 117 is proximal to surface 16 of LED 10 and is also substantially parallel to surface 16. Preferably there is an air gap between surface 16 and base 117.

Light is internally generated by the LED 10 and emitted through the surface 16 of the LED. The emitted light is transmitted through base 117 of the pyramid to be incident upon one or more of the four connected sides 112, 113, 114 and 115 of the pyramid. Side 112 is opposite side 114. Side 113 is opposite side 115. The four sides are connected to base 117. The four sides also form an apex 116 that is distal from surface 16. At the apex, side 112 and side 114 form an interior angle 118. Similarly at the apex, side 113 and side 115 form an interior angle (not shown) equal to interior angle 118. Interior angle 118 is preferably 60 degrees to 120 degrees and more preferably 80 degrees to 100 degrees.

The pyramid 110 is constructed from any solid material that is transparent to the internally generated light of LED 10. Appropriate materials are inorganic crystalline materials, inorganic glasses and transparent polymer materials. Example inorganic crystalline materials include sapphire, cubic zirconia, diamond and garnet materials. Example inorganic glasses include fused silica and BK7 glass. Example polymer materials include polymethylmethacrylate, polycarbonate and polystyrene.

Pyramid 110 is shown in FIGS. 2A and 2B to have four sides. It is also within the scope of this invention that pyramid 110 can have more or less than four sides. For example, pyramid 110 can have three sides or six sides. Whether pyramid 110 has three sides, four sides or more than four sides, the area of the base 117 of pyramid 110 should cover the emitting surface 16 of LED 10 so that pyramid 110 accepts substantially all of the internally generated light emitted by LED 10.

LED 10 emits internally generated light over a first angular range. Pyramid 110 is positioned in the light optical path of the light output of LED 10. A first portion of the internally generated light emitted by LED 10 and directed to pyramid 110 will be transmitted by pyramid 110. A second portion of the internally generated light emitted by LED 10 will undergo total internal reflection by pyramid 110 and will be directed back to LED 10. Whether the light is transmitted or undergoes total internal reflection by pyramid 110 depends on three parameters. The first parameter is the angle of light emission from LED 10 relative to the z-axis, where the z-axis is defined as the direction perpendicular to the surface of LED 10. The second parameter is the interior angle 118 of the pyramid 110. The third parameter is the critical angle $\theta_c$ for total internal reflection from the sides 112, 113, 114 and 115 of pyramid 110. The critical angle, in turn, depends on the refractive index n of pyramid 110.

If pyramid 110 has a refractive index n and is surrounded by air that has a refractive index of 1.00, light that is inside the pyramid and is incident on a side of the pyramid with an angle less than $\theta_c$ will exit from the pyramid. Light that is inside the pyramid and is incident on a side of the pyramid with an angle greater than $\theta_c$ will undergo total internal reflection from the side and be directed toward the opposing side where it can again undergo total internal reflection. After undergoing total internal reflection from two opposing sides of the pyramid, the light is directed back toward the base 117. If the internally reflected light that is inside pyramid 110 is incident on the base 117 at an angle less than the critical angle, which is normally the case for light incident on the base, the light will be transmitted back through the base.

The critical angle $\theta_c$ is given by $$\theta_c = \arcsin(1/n), \qquad \text{[Equation 3]}$$

where $\theta_c$ is measured relative to a direction perpendicular to the appropriate side of pyramid 110 and n is the refractive index of the pyramid. If n=1.50, for example, then $\theta_c$ is approximately 42 degrees. The side of the pyramid will transmit light that is inside the pyramid and that has incident angles between zero and approximately 42 degrees. Light inside the pyramid that is incident on a side of the pyramid at angles between approximately 42 degrees and 90 degrees will undergo total internal reflection.

The first portion of the internally generated light emitted by LED 10 that is refracted and transmitted by pyramid 110 will have exiting angles from pyramid 110 that are less than the emission angles from LED 10. The emitting angles from LED 10 and the exiting angles from pyramid 110 are both measured relative to the z-axis. If LED 10 emits internally generated light with a first angular range, the first portion of the internally generated light of LED 10 transmitted by pyramid 110 will have a second angular range, less than the first angular range. The magnitude of the second angular range will depend on the magnitude of the first angular range, the interior angle 118 of pyramid 110 and the refractive index of pyramid 110. If the angular output distribution of LED 10 is Lambertian with a first angular range of approximately 120 degrees, preferably the second angular range of light transmitted by pyramid 110 is less than 100 degrees. More preferably the second angular range is less than 90 degrees. As an illustrative example, if the first angular range of LED 10 is 120 degrees, the interior angle 118 of pyramid 110 is 90 degrees and the refractive index of pyramid 110 is 1.50, then the second angular range is approximately 80 degrees.

The second portion of the internally generated light emitted by LED 10 undergoes total internal reflection inside pyramid 110 and is recycled back to LED 10. Reflecting layer 14 of LED 10 can reflect the recycled second portion of the internally generated light. If reflecting layer 14 of LED 10 reflects the recycled light to relatively high angles, the light reflected by the reflecting layer may be transmitted by pyramid 110 and exit illumination system 100. The recycled light that reflects from LED 10 will increase the effective brightness of LED 10.

Light rays 120 and 130 illustrate the operation of illumination system 100. Multi-layer semiconductor structure 12 of LED 10 emits light ray 120 through surface 16 at angle 122. Angle 122 is within a first angular range. Light ray 120 enters pyramid 110 through base 117 and is directed to surface 114 at angle 124. Angle 124 is less than the critical angle. Since angle 124 is less than the critical angle, light ray 120 will be transmitted through surface 114. Light ray 120 exits surface 114 of pyramid 110 at angle 126, measured relative to the z-axis. Due to the refraction of light ray 120 at base 117 and side 114, angle 126 is less than angle 122. Light ray 120 exits pyramid 110 within a second angular range that is smaller than the first angular range of the internally generated light emitted by LED 10.

Multi-layer semiconductor structure 12 emits light ray 130 through surface 16 at angle 132. Angle 132 is within a first angular range. Light ray 130 enters pyramid 110 through base 117 and is directed to surface 114 at angle 134. Angle 134 is greater than the critical angle. Since angle 134 is greater than the critical angle, light ray 130 will undergo total internal reflection by surface 114. Light ray is directed to surface 112 at angle 136. Angle 136 is greater than the critical angle. Light ray 130 will undergo total internal reflection from surface 112 and be directed back to surface 117. Light ray 130 passes through base 117 and is directed toward LED 10. Light ray 130 enters LED 10 through surface 16, is reflected by reflecting layer 14 and exits LED 10 through surface 16 at angle 138. Angle 138 is within a first angular range. Light ray 130 is transmitted by base 117 and is directed to side 112 at angle 140. If angle 138 is a relatively large angle as shown in FIG. 2B, then angle 140 can be less than the critical angle and light ray 130 will be transmitted by surface 112. Angle 138 can be a large angle if, for example, reflecting layer 14 is a diffuse reflector or if multi-layer semiconductor structure 12 scatters light. Light ray 130 exits side 112 and exits the illumination system 100 at angle 142. Angle 142 is within a second angular range. Due to the refraction of light ray 130 at base 117 and side 112, angle 142 that is less than angle 138.

Light ray 120 illustrates that internally generated light emitted from LED 10 at large angles in a first angular range is transmitted by pyramid 110, but exits pyramid 110 at angles smaller than the initial emission angles from LED 10. Light rays emitted from LED 10 that undergo total internal reflection inside pyramid 110 are recycled back to LED 10. Overall, pyramid 110 transmits a first portion of the internally generated light with a second angular range that is smaller than the first angular range, and reflects a second portion of the internally generated light back to LED 10.

Although only the Z-X plane has been shown and discussed, the pyramid 110 also reduces the angular range in the Z-Y plane with the same operation. Accordingly, the pyramid reduces the angular range of the light rays in both the Z-X plane and the Z-Y plane.

Figure 3A:
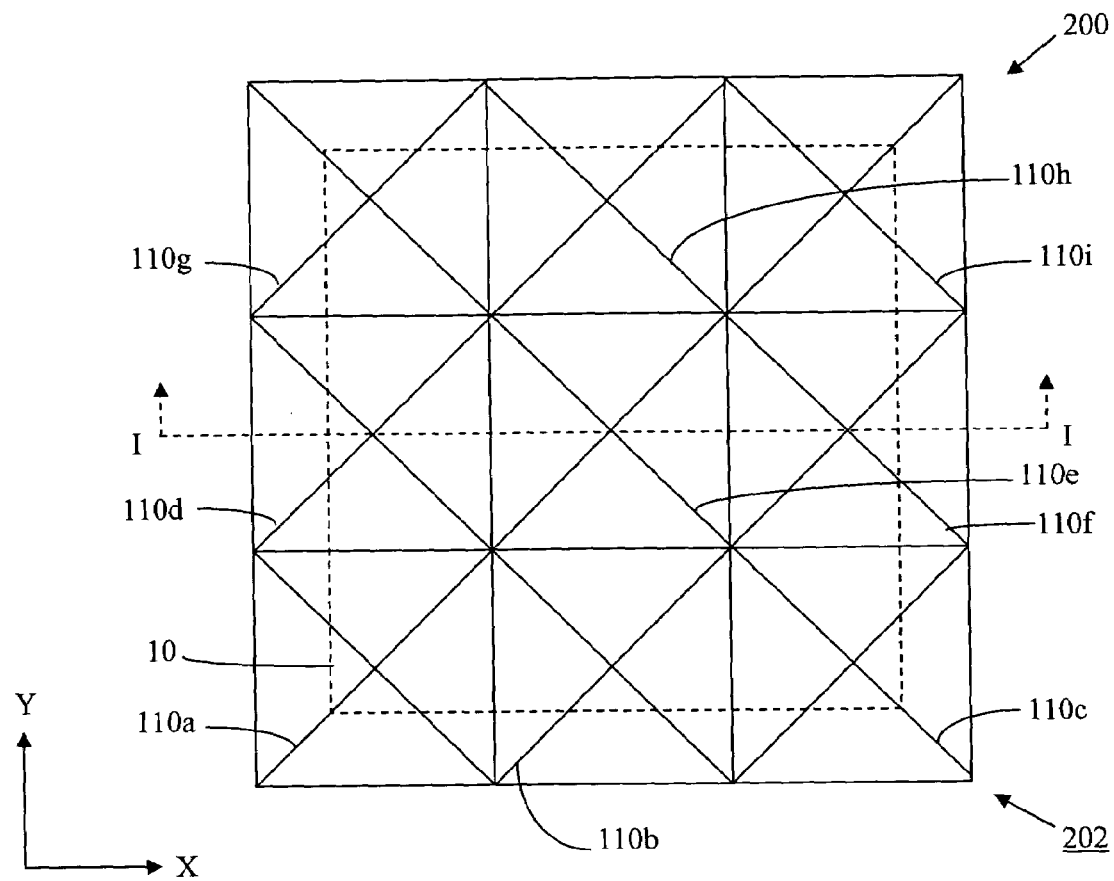
FIG. 3A is a plan view of another embodiment of this invention incorporating a three-by-three array of four-sided pyramids.
Figure 3B:
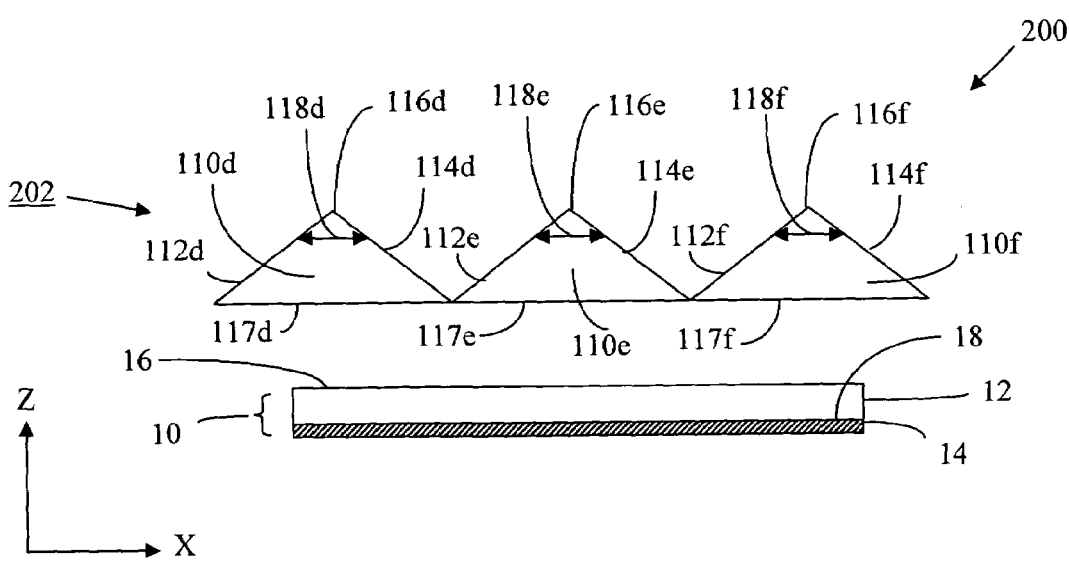
FIG. 3B is a cross-sectional view along the I-I plane illustrated in FIG. 3A.
Figure 3C:
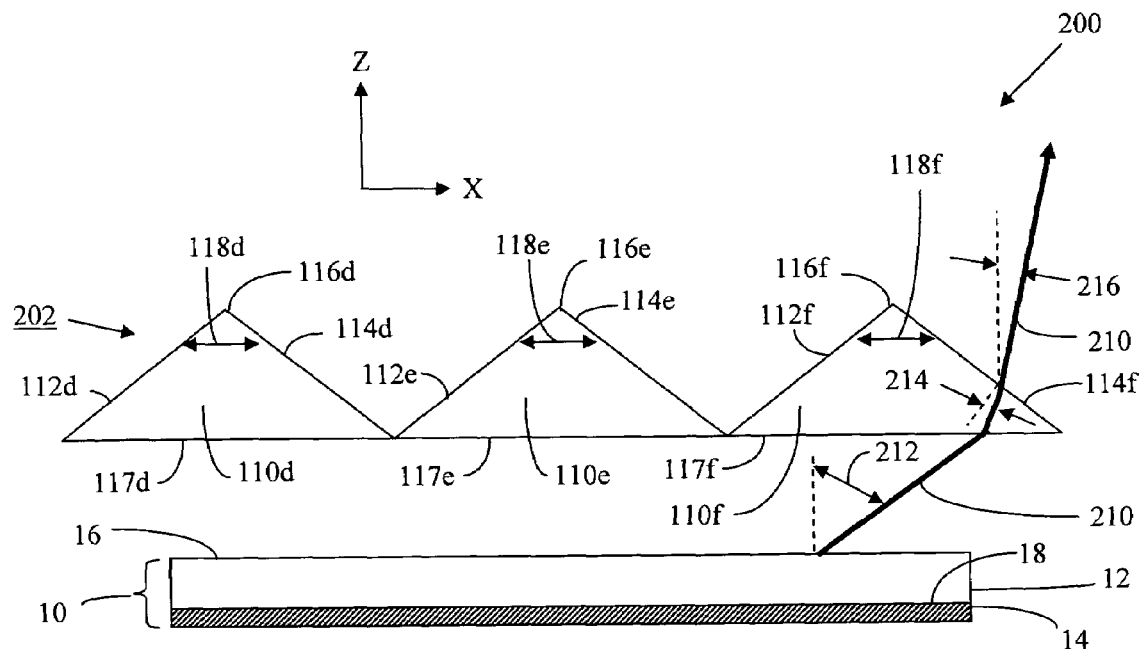
FIGS. 3C and 3D are expanded views of FIG. 3B.
Figure 3D:
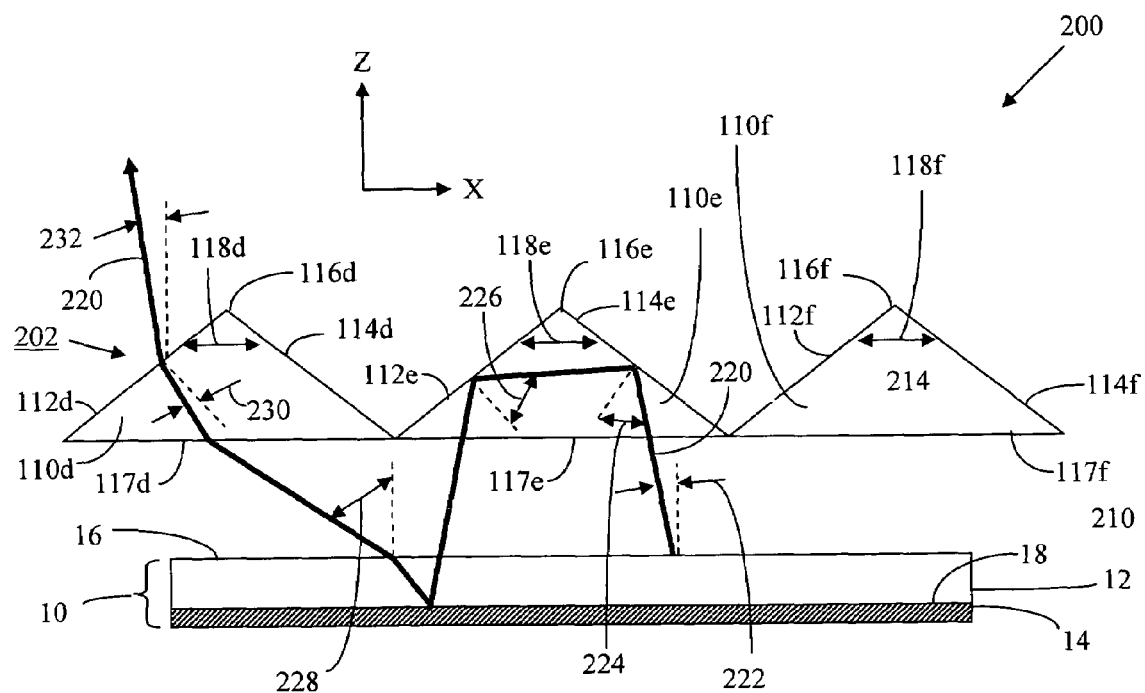

Illumination system 200 illustrated in FIGS. 3A and 3B is another embodiment of this invention. FIG. 3A is a plan view of illumination system 200 viewed from above in the X-Y plane. FIG. 3B is a Z-X cross-sectional side view along the I-I plane indicated in FIG. 3A. FIGS. 3C and 3D are expanded Z-X cross-sectional views of FIG. 3B. Illumination system 200 is comprised of LED 10 (illustrated previously in FIG. 1A) and a partially reflecting optical element.

In this embodiment, the partially reflecting optical element is an array 202 of nine pyramids, arranged as a three-by-three array. The pyramids in the array 202 are denoted as 110a, 110b, 110c, 110d, 110e, 110f, 110g, 110h and 110i. Each pyramid in array 202 is equivalent to pyramid 110 in illumination system 100 and each pyramid in array 202 functions in a similar manner to pyramid 110. Each pyramid in the array has four connected sides that are also connected to a base. The bases of each pyramid in the array 202 are joined to form a close packed planar surface. The four sides of each pyramid form an apex. At each apex, opposing sides of each pyramid form an interior angle. For example, pyramid 110d has base 117d, apex 116d and interior angle 118d. Preferably each pyramid in array 202 is equivalent to the other pyramids in the array and preferably the interior angle of each pyramid is equal to the interior angles of the other pyramids in the array. Preferably the interior angles are in the range of 60 degrees to 120 degrees, more preferably 80 to 100 degrees. Preferable materials for the array of pyramids are identical to the preferred materials for pyramid 110 in illumination system 100.

Although each pyramid in array 202 has four sides, it is also within the scope of this invention that each pyramid can have more or less than four sides. For example, each pyramid in the array can have three sides or six sides and the pyramids can be joined together at the bases to form a close packed array.

The array of pyramids is positioned in the light optical path of the light output of LED 10. The plane formed by the bases of the array of pyramids may be in close proximity with the surface 16 of LED 10 but preferably there is an air gap between surface 16 of LED 10 and the bases of the pyramids.

LED 10 emits internally generated light over a first angular range. A first portion of the internally generated light emitted by LED 10 and directed to the array of pyramids will be transmitted by the array of pyramids. A second portion of the internally generated light emitted by LED 10 will undergo total internal reflection by the array 202 back to LED 10. As in illumination system 100, whether the light is transmitted or reflected by the array of pyramids in illumination system 200 depends on three parameters. The first parameter is the angle of light emission from LED 10 relative to the z-axis, where the z-axis is defined as the direction perpendicular to the surface of LED 10. The second parameter is the interior angle for each pyramid in the array 202. The third parameter is the critical angle $\theta_c$ for total internal reflection from the sides of the array of pyramids. The critical angle, in turn, depends on the refractive index of the array of pyramids.

If the array 202 has a refractive index n and is surrounded by air that has a refractive index of 1.00, light that is inside any pyramid in the array of pyramids and is incident on a side of the pyramid with an angle less than $\theta_c$ will exit from the pyramid. Light that is inside a pyramid in the array 202 and is incident on a side of the pyramid with an angle greater than $\theta_c$ will undergo total internal reflection from that side and be directed toward the opposing side where it can again undergo total internal reflection. After undergoing total internal reflection from two opposing sides of the pyramid, the light is directed back toward the base of the pyramid. If the reflected light that is internal to a pyramid is incident on the base of the pyramid at an angle less than the critical angle, which is normally the case for internal light incident on the base, the light will be transmitted through the base.

The first portion of the internally generated light emitted by LED 10 that is transmitted by the array 202 will have exiting angles from the array of pyramids that are less than the emission angles from LED 10. The emitting angles from LED 10 and the exiting angles from the array of pyramids are both measured relative to the z-axis. If LED 10 emits internally generated light with a first angular range, the first portion of the internally generated light of LED 10 transmitted by the array of pyramids will have a second angular range, less than the first angular range. The magnitude of the second angular range will depend on the magnitude of the first angular range, the interior angle of each pyramid in the array of pyramids and the refractive index of the array of pyramids. If the angular output distribution of LED 10 is Lambertian with a first angular range of approximately 120 degrees, preferably the second angular range of light exiting the array of pyramids is less than 100 degrees. More preferably the second angular range is less than 90 degrees. As an illustrative example, if the first angular range of LED 10 is 120 degrees, the interior angle of each pyramid in the array of pyramids is 90 degrees and the refractive index of the array of pyramids is 1.50, then the second angular range is approximately 80 degrees.

The second portion of the internally generated light emitted by LED 10 undergoes total internal reflection inside the array 202 and is recycled back to LED 10. Reflecting layer 14 of LED 10 can reflect the recycled second portion of the internally generated light. If reflecting layer 14 of LED 10 reflects the recycled light to relatively high angles, the light reflected by the reflecting layer may be transmitted by the array of pyramids and exit illumination system 200. The recycled light that reflects from LED 10 will increase the effective brightness of LED 10.

Light rays 210 and 220 illustrate the operation of illumination system 200. Multi-layer semiconductor structure 12 of illumination system 200 emits light ray 210 through surface 16 at angle 212. Angle 212 is within a first angular range. Light ray 210 enters pyramid 110f through base 117f and is directed to surface 114f at angle 214. Angle 214 is less than the critical angle. Since angle 214 is less than the critical angle, light ray 210 will be transmitted through surface 114f. Light ray 210 exits surface 114f of pyramid 110f at angle 216, measured relative to the z-axis. Due to the refraction of light ray 210 at base 117f and side 114f, angle 216 is less than angle 212. Light ray 210 exits pyramid 110f within a second angular range that is smaller than the first angular range of the internally generated light emitted by LED 10.

Multi-layer semiconductor structure 12 of illumination system 200 emits light ray 220 through surface 16 at angle 222. Angle 222 is within a first angular range. Light ray 220 enters pyramid 110e through base 117e and is directed to surface 114e at angle 224. Angle 224 is greater than the critical angle. Since angle 224 is greater than the critical angle, light ray 220 will undergo total internal reflection by surface 114e. Light ray 220 is directed to surface 112e at angle 226. Angle 226 is greater than the critical angle. Light ray 220 will undergo total internal reflection from surface 112e and be directed back to base 117e. Light ray 220 passes through base 117e and is directed toward LED 10. Light ray 220 enters LED 10 through surface 16, is reflected by reflecting layer 14 and exits LED 10 through surface 16 at angle 228. Light ray 220 is transmitted by base 117d of pyramid 110d and is directed to side 112d at angle 230. If angle 228 is a relatively large angle as shown in FIG. 3D, then angle 230 can be less than the critical angle and light ray 220 will be transmitted by surface 112*d*. Angle 228 can be a large angle if, for example, reflecting layer 14 is a diffuse reflector or if multi-layer semiconductor structure 12 scatters light. Light ray 220 exits side 112*d* and exits the illumination system 200 at angle 232. Due to the refraction of light ray 220 at base 117*d* and side 112*d*, angle 232 that is less than angle 228.

Light ray 210 illustrates that internally generated light emitted from LED 10 at large angles in a first angular range is transmitted by the array of pyramids, but exits the array of pyramids at angles smaller than the initial emission angles from LED 10. Light rays that undergo total internal reflection inside the array of pyramids are recycled by the array of pyramids back to LED 10. Overall, the array of pyramids transmits a first portion of the internally generated light with a second angular range, smaller than the first angular range, and reflects a second portion of the internally generated light back to LED 10.

Although only the Z-X plane has been shown and discussed, the array of pyramids also reduces the angular range in the Z-Y plane with the same operation. Accordingly, the array of pyramids reduces the angular range of the light rays in both the Z-X plane and the Z-Y plane.

Figure 4A:
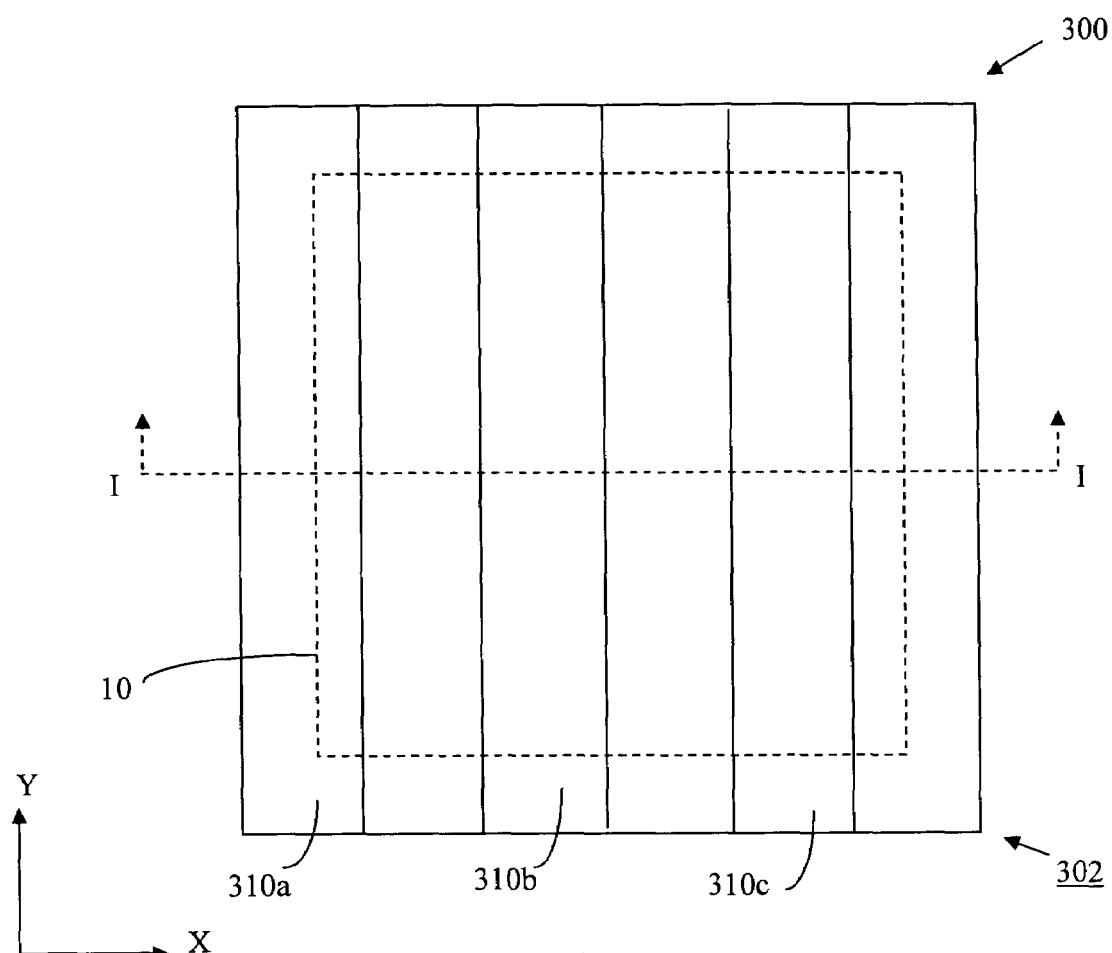
FIG. 4A is a plan view of another embodiment of this invention incorporating an array of prisms that are aligned with the Y-axis.
Figure 4B:
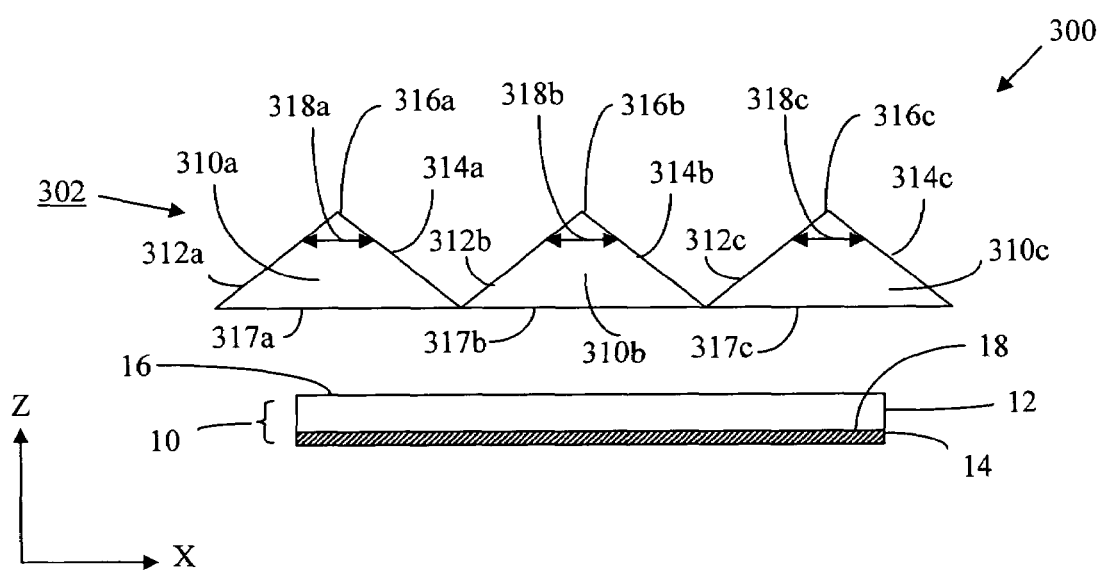
FIG. 4B is a cross-sectional view along the I-I plane illustrated in FIG. 4A.
Figure 4C:
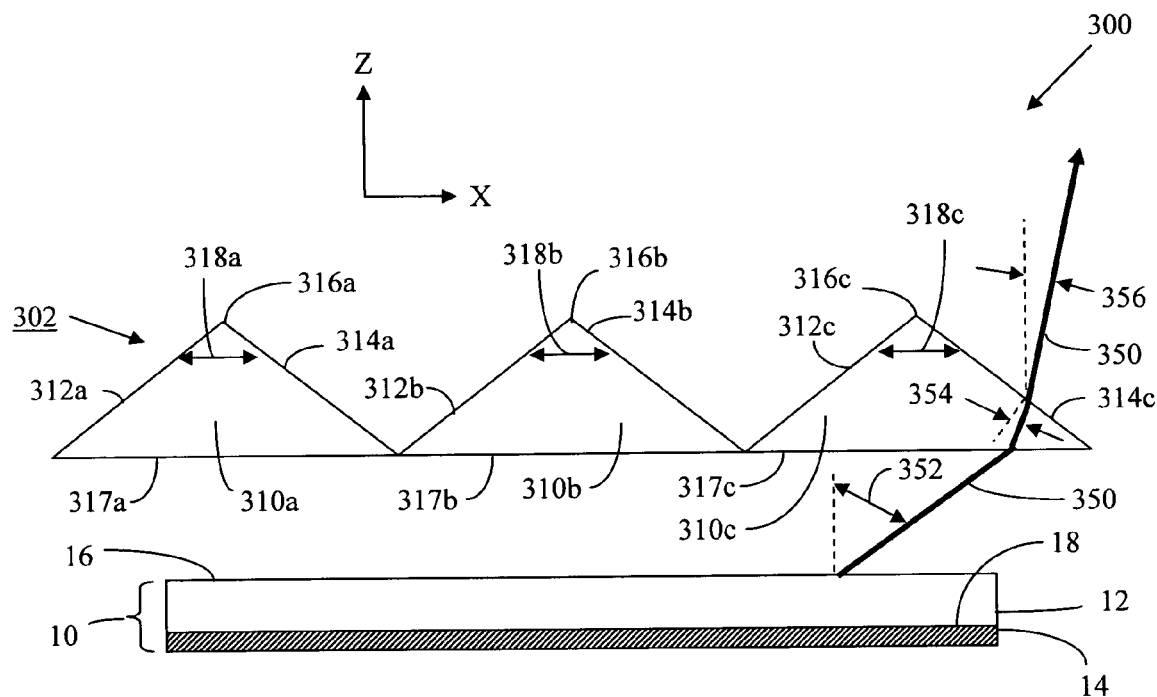
FIGS. 4C and 4D are expanded views of FIG. 4B.
Figure 4D:
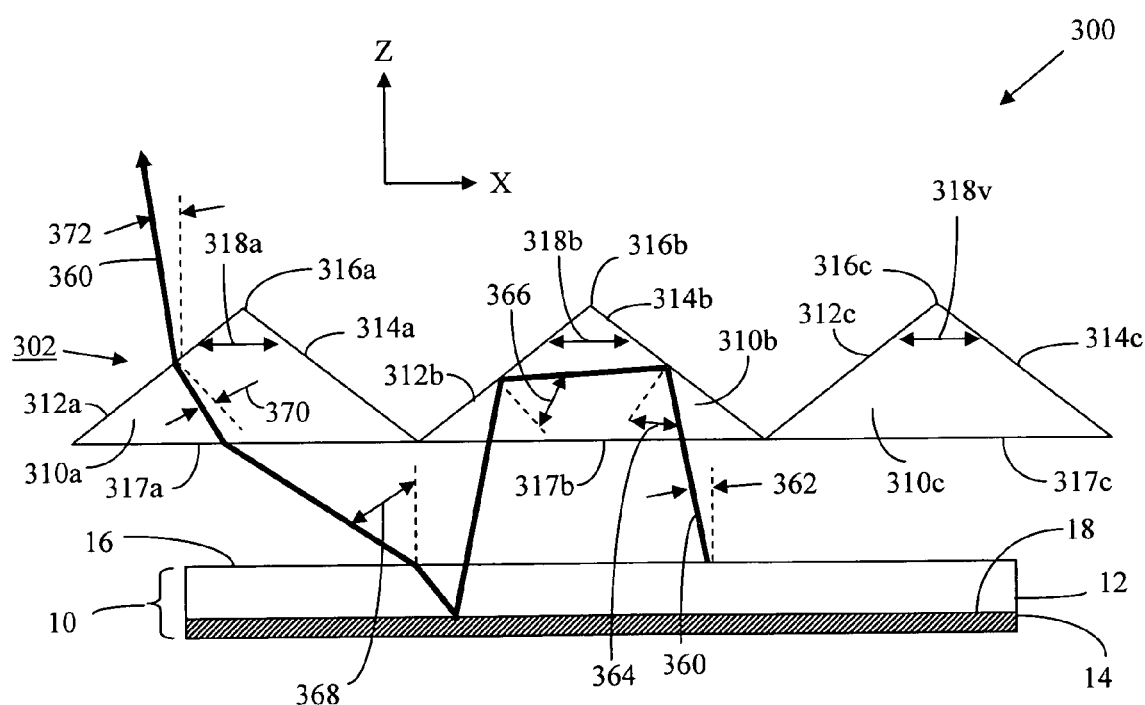

Illumination system 300 illustrated in FIGS. 4A-4D is another embodiment of this invention. FIG. 4A is a plan view of illumination system 300 viewed from above in the X-Y plane. FIG. 4B is a Z-X cross-sectional side view along the I-I plane indicated in FIG. 4A. FIGS. 4C and 4D are expanded Z-X cross-sectional views along the I-I plane. Illumination system 300 is comprised of LED 10 and a partially reflecting optical element.

In this embodiment, the partially reflecting optical element is an array of prisms 302, comprised of three prisms arranged as a one-by-three array. The array is shown with three prisms, but it is within the scope of this invention that the array can have two prisms or more than three prisms. The prisms in the array of prisms 302 are denoted as 310*a*, 310*b* and 310*c*. Each prism in the array has two connected sides and two ends that are all connected to a base. The base of each prism is preferably rectangular in shape. The long axis of each prism is parallel to the Y axis in FIG. 4A. The bases of each prism are joined to form a close packed planar surface. The two sides of each prism form an apex with an interior angle. For example, prism 310*a* has base 317*a*, sides 312*a* and 314*a*, apex 316*a* and interior angle 318*a*. Preferably each prism in the array of prisms 302 is equivalent to the other prisms in the array. Although not a requirement, preferably the interior angle of each prism is equal to the interior angles of the other prisms in the array. Preferably the interior angles are in the range of 60 degrees to 120 degrees, more preferably 80 to 100 degrees. Preferred materials for the array of prisms are identical to the preferred materials for pyramid 110 in illumination system 100. An example of an exemplary array of prisms is "brightness enhancement film" or BEF™ produced by 3M Corporation.

The array of prisms is positioned in the light optical path of the light output of LED 10. The plane formed by the bases 317*a*, 317*b* and 317*c* of the array of prisms 302 is in close proximity with the surface 16 of LED 10. Preferably there is an air gap between surface 16 of LED 10 and the bases of the prisms.

LED 10 in illumination system 300 emits internally generated light over a first angular range. A first portion of the internally generated light emitted by LED 10 and directed to the array of prisms will be transmitted by the array of prisms. A second portion of the internally generated light emitted by LED 10 will undergo total internal reflection by the array of prisms 302 and be recycled back to LED 10. The recycled light that reflects from LED 10 will increase the effective brightness of LED 10. Whether or not the light is transmitted or reflected by the array of prisms in illumination system 300 depends on three parameters. The first parameter is the angle of light emission from LED 10 relative to the z-axis, where the z-axis is defined as the direction perpendicular to the surface of LED 10. The second parameter is the interior angle for each prism in the array. The third parameter is the critical angle $\theta_c$ for total internal reflection from the sides of the array of prisms. The critical angle, in turn, depends on the refractive index of the array of prisms and is given by Equation 3.

If the array of prisms 302 has a refractive index n and is surrounded by air that has a refractive index of 1.00, light that is inside any prism in the array and is incident on a side of a prism with an angle less than $\theta_c$ will exit from the prism. Light that is inside a prism in the array of prisms 302 and is incident on a side of the prism with an angle greater than $\theta_c$ will undergo total internal reflection from the side and be directed toward the opposing side where it can again undergo total internal reflection. After undergoing total internal reflection from the two opposing sides of the prism, the light is directed back toward the base of the prism. If the reflected light that is internal to a prism is incident on the base of the prism at an angle less than the critical angle, which is normally the case for internal light incident on the base of the prism, the light will be transmitted through the base.

The internally generated light emitted by LED 10 will be transmitted by the array of prisms 302 with a reduced angular range in the Z-X plane but with no change in the angular range in the Z-Y plane. The emitting angles from LED 10 and the exiting angles from the array of prisms are both measured in the Z-X plane relative to the z-axis. If LED 10 emits internally generated light with a first angular range, the first portion of the internally generated light of LED 10 transmitted by the array of prisms in the Z-X plane will have a second angular range, less than the first angular range. The magnitude of the second angular range in the Z-X plane will depend on the magnitude of the first angular range, the interior angle of each prism in the array of prisms and the refractive index of the array of prisms. If the angular output distribution of LED 10 is Lambertian with a first angular range of approximately 120 degrees, preferably the second angular range of light exiting the array of prisms is less than 100 degrees. More preferably the second angular range is less than 90 degrees. As an illustrative example, if the first angular range of LED 10 is 120 degrees, the interior angle of each prism in the array of prisms is 90 degrees and the refractive index of the array of prisms is 1.50, then the second angular range in the Z-X plane is approximately 80 degrees.

The second portion of the internally generated light emitted by LED 10 undergoes total internal reflection inside the array of prisms 302 and is recycled back to LED 10. Reflecting layer 14 of LED 10 can reflect the recycled second portion of the internally generated light. If reflecting layer 14 of LED 10 reflects the recycled light at relatively high angles towards the array of prisms 302, the light reflected by the reflecting layer 14 may be transmitted by the array of prisms and exit illumination system 300.

Light rays 350 and 360 illustrate the operation of illumination system 300. Multi-layer semiconductor structure 12 of illumination system 300 emits light ray 350 through surface 16 at angle 352 in the Z-X plane. Angle 352 is within a first angular range. Light ray 350 enters prism 310c through base 317c and is directed to surface 314c at angle 354. Since angle 354 is less than the critical angle, light ray 350 will be transmitted through surface 314c. Light ray 350 exits surface 314c of prism 310c at angle 356, measured relative to the z-axis. Due to the refraction of light ray 350 at base 317c and side 314c, angle 356 is less than angle 352. Light ray 350 therefore exits prism 310c within a second angular range in the Z-X plane that is smaller than the first angular range of the internally generated light emitted by LED 10.

Multi-layer semiconductor structure 12 of illumination system 300 emits light ray 360 through surface 16 at angle 362 in the Z-X plane. Angle 362 is within a first angular range. Light ray 360 enters prism 310b through base 317b and is directed to surface 314b at angle 364. Since angle 364 is greater than the critical angle, light ray 360 will undergo total internal reflection by surface 314b. Light ray 360 is directed to surface 312b at angle 366. Angle 366 is greater than the critical angle. Light ray 360 will undergo total internal reflection from surface 312b and be directed back to base 317b. Light ray 360 is directed to base 317b at less than the critical angle, passes through base 317b and is directed toward LED 10. Light ray 360 enters LED 10 through surface 16, passes through the multi-layer semiconductor structure 12, is reflected by reflecting layer 14, again passes through the multi-layer semiconductor structure 12 and exits LED 10 through surface 16 at angle 368. Light ray 360 is transmitted by base 317a of prism 310a and is directed to side 312a at angle 370. If angle 368 is a relatively large angle as shown in FIG. 4D, then angle 370 can be less than the critical angle and light ray 360 will be transmitted by surface 312a. Angle 368 can be a large angle if, for example, reflecting layer 14 is a diffuse reflector or if the multi-layer semiconductor structure 12 scatters light. Light ray 360 exits side 312a and exits the illumination system 300 at angle 372 in the Z-X plane. Because of the refraction of light ray 360 at base 317a and side 312a, angle 372 is less than angle 368.

Light ray 350 illustrates that internally generated light emitted from LED 10 at large angles in a first angular range is transmitted by the array of prisms, but exits the array of prisms at angles in the Z-X plane that are smaller than the initial emission angles from LED 10. Light rays that undergo total internal reflection inside the array of prisms are recycled by the array of prisms back to LED 10. Overall, the array of prisms transmits a first portion of the internally generated light with a second angular range, smaller than the first angular range, and reflects a second portion of the internally generated light back to LED 10.

The array of prisms 302 in illumination system 300 reduces the angular range in the Z-X plane of light transmitted by the array. It is also possible to reduce the angular range of light in the Z-Y plane by using an equivalent array of prisms that is rotated 90 degrees in the X-Y plane relative to the array of prisms 302. This embodiment is illustrated by illumination system 400.

Figure 5A:
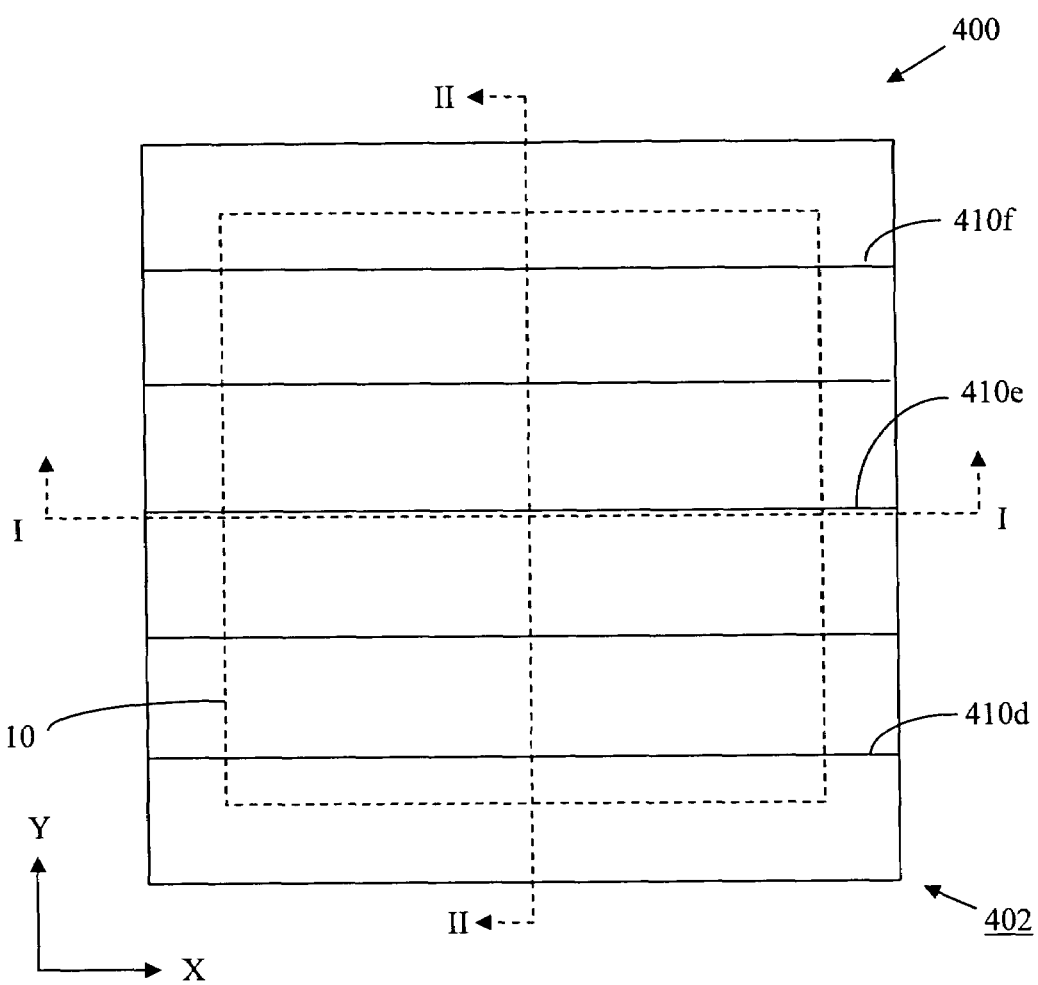
FIG. 5A is a plan view of another embodiment of this invention incorporating an array of prisms that are aligned with the X-axis.
Figure 5B:
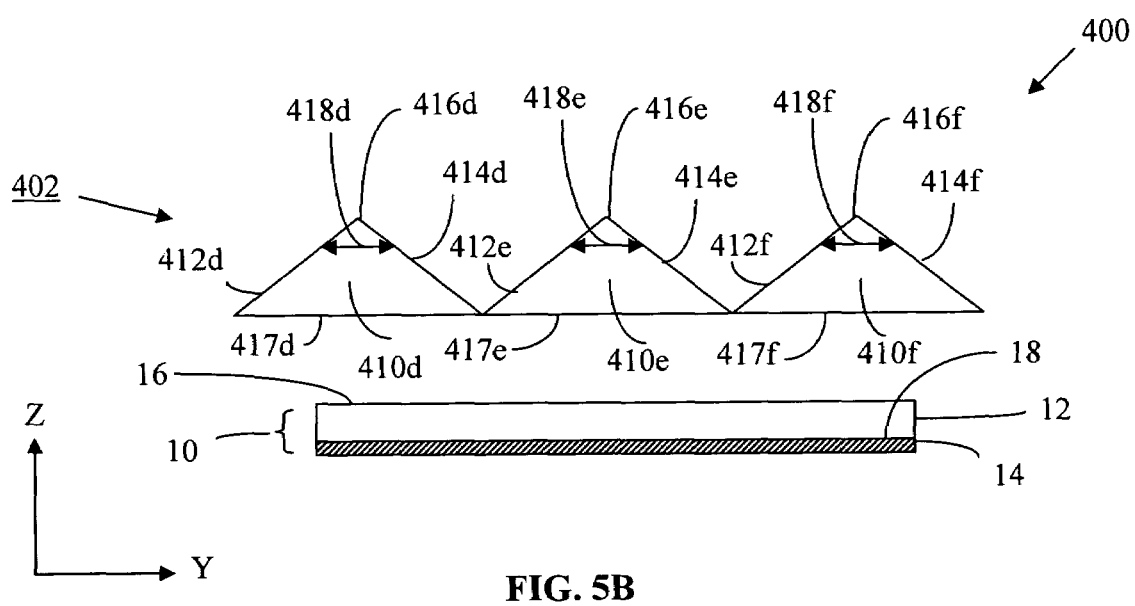
FIG. 5B is a cross-sectional view along the II-II plane illustrated in FIG. 5A.
Figure 5C:
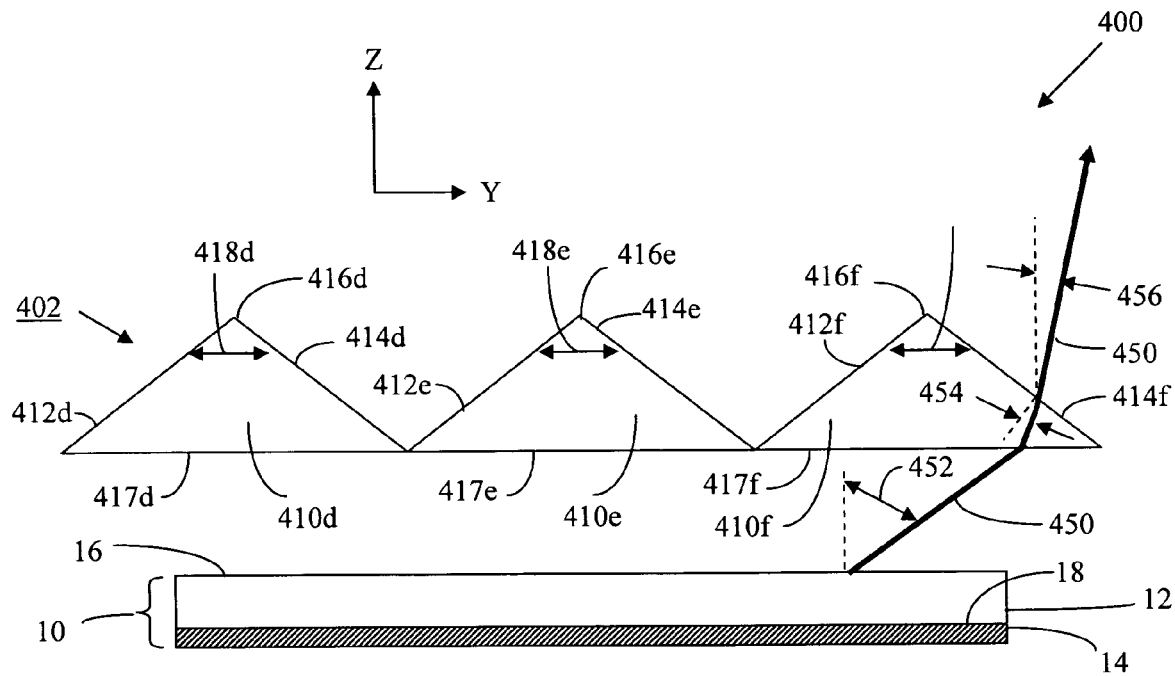
FIGS. 5C and 5D are expanded views of FIG. 5B.
Figure 5D:
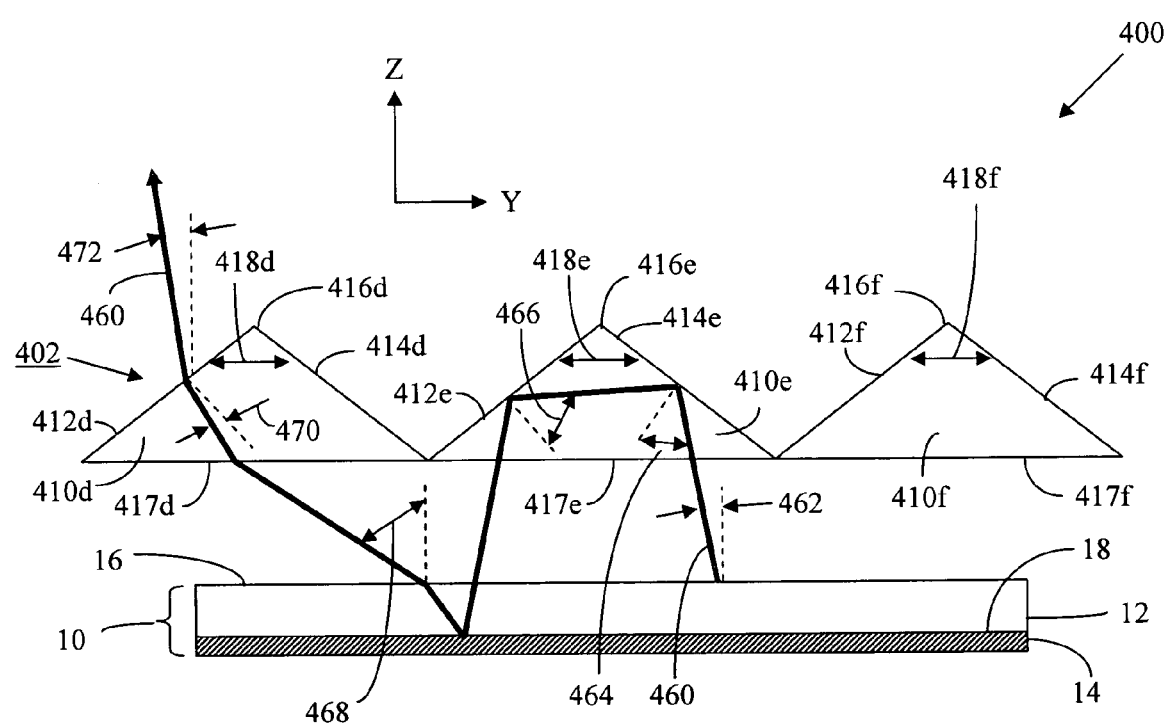

Illumination system 400 illustrated in FIGS. 5A-5D is another embodiment of this invention. FIG. 5A is a plan view of illumination system 400 viewed from above in the X-Y plane. FIG. 5B is a Z-Y cross-sectional side view along the II-II plane indicated in FIG. 5A. FIGS. 5C and 5D are expanded Z-Y cross-sectional views along the II-II plane. Illumination system 400 is comprised of LED 10 and a partially reflecting optical element.

In this embodiment, the partially reflecting optical element is an array of prisms 402, comprised of three prisms arranged as a one-by-three array. It is also within the scope of this invention that the array of prisms 402 may be comprised of two prisms or more than three prisms. The array of prisms 402 in FIGS. 5A-5D is identical to the array of prisms 302 in FIGS. 4A-4D except that the prisms in the array of prisms 402 are aligned with the long axes of the prisms parallel to the X axis instead of the Y axis. The prisms in the array of prisms 402 are denoted as 410d, 410e and 410f. Each prism in the array has two connected sides and two ends that are all connected to a base. The base of each prism is preferably rectangular in shape. The bases of each prism are joined to form a close packed planar surface. The two sides of each prism form an apex with an interior angle. For example, prism 410d has base 417d, sides 412d and 414d, apex 416d and interior angle 418d. Preferably each prism in array is equivalent to the other prisms in the array. Although not a requirement, preferably the interior angle of each prism is equal to the interior angles of the other prisms in the array. Preferably the interior angles are in the range of 60 degrees to 120 degrees, more preferably 80 to 100 degrees. Preferred materials for the array of prisms are identical to the preferred materials for pyramid 110 in illumination system 100. An example of an exemplary array of prisms is BEF™ film produced by 3M Corporation.

The array of prisms is positioned in the light optical path of the light output of LED 10. The plane formed by the bases 417d, 417e and 417f of the array of prisms 402 is in close proximity with the surface 16 of LED 10. Preferably there is an air gap between surface 16 of LED 10 and the bases of the prisms.

LED 10 emits internally generated light over a first angular range. A first portion of the internally generated light emitted by LED 10 and directed to the array of prisms 402 will be transmitted by the array. A second portion of the internally generated light emitted by LED 10 will undergo total internal reflection by the array of prisms 402 and be recycled back to LED 10. The recycled light that reflects from LED 10 will increase the effective brightness of LED 10. Whether or not the light is transmitted or reflected by the array of prisms in illumination system 400 depends on the angle of light emission from LED 10 relative to the z-axis, the interior angle for each prism in the array 302 and the critical angle $\theta_c$ for total internal reflection from the sides of the array of prisms. The critical angle, in turn, depends on the refractive index of the array of prisms and is given by Equation 3.

Light that is inside any prism in the array of prisms 402 and is incident on a side of a prism with an angle less than $\theta_c$ will exit from the prism. Light that is inside a prism in the array and is incident on a side of the prism with an angle greater than $\theta_c$ will undergo total internal reflection from the side and be directed toward the opposing side where it can again undergo total internal reflection. After undergoing total internal reflection from the two opposing sides of the prism, the light is directed back toward the base of the prism. If the reflected light that is internal to a prism is incident on the base of the prism at an angle less than the critical angle, which is normally the case for internal light incident on the base, the light will be transmitted through the base.

The internally generated light emitted by LED 10 will be transmitted by the array of prisms 402 with a reduced angular range in the Z-Y plane but with no change in the angular range in the Z-X plane. The emitting angles from LED 10 and the exiting angles from the array of prisms are both measured in the Z-Y plane relative to the z-axis. If LED 10 emits internally generated light with a first angular range, the first portion of the internally generated light of LED 10 transmitted by the array of prisms in the Z-Y plane will have a second angular range, smaller than the first angular range. The magnitude of the second angular range in the Z-Y plane will depend on the magnitude of the first angular range, the interior angle of each prism in the array of prisms and the refractive index of the array of prisms. If the angular output distribution of LED 10 is Lambertian with a first angular range of approximately 120 degrees, preferably the second angular range of light exiting the array of prisms is less than 100 degrees. More preferably the second angular range is less than 90 degrees. As an illustrative example, if the first angular range of LED 10 is 120 degrees, the interior angle of each prism in the array of prisms is 90 degrees and the refractive index of the array of prisms is 1.50, then the second angular range is approximately 80 degrees.

The second portion of the internally generated light emitted by LED 10 undergoes total internal reflection inside the array of prisms 402 and is recycled back to LED 10. Reflecting layer 14 of LED 10 can reflect the recycled second portion of the internally generated light. If reflecting layer 14 of LED 10 reflects the recycled light to relatively high angles, the light reflected by the reflecting layer may be transmitted by the array and exit illumination system 400.

Light rays 450 and 460 illustrate the operation of illumination system 400. Multi-layer semiconductor structure 12 of illumination system 400 emits light ray 450 through surface 16 at angle 452 in the Z-Y plane. Angle 452 is within a first angular range. Light ray 450 enters prism 410f through base 417f and is directed to surface 414f at angle 454. Since angle 454 is less than the critical angle, light ray 450 will be transmitted through surface 414f. Light ray 450 exits surface 414f of prism 410f at angle 456 in the Z-Y plane, measured relative to the z-axis. Due to the refraction of light ray 450 at base 417f and side 414f, angle 456 is less than angle 452. Light ray 450 exits prism 410f within a second angular range in the Z-Y plane that is smaller than the first angular range of the internally generated light emitted by LED 10.

Multi-layer semiconductor structure 12 of illumination system 400 emits light ray 460 through surface 16 at angle 462 in the Z-Y plane. Angle 462 is within a first angular range. Light ray 460 enters prism 410e through base 417e and is directed to surface 414e at angle 464. Since angle 464 is greater than the critical angle, light ray 460 will undergo total internal reflection by surface 414e. Light ray 460 is directed to surface 412e at angle 466. Angle 466 is greater than the critical angle. Light ray 460 will undergo total internal reflection from surface 412e and be directed back to base 417e. Light ray 460 passes through base 417e and is directed toward LED 10. Light ray 460 enters LED 10 through surface 16, passes through the multi-layer semiconductor structure 12, is reflected by reflecting layer 14, again passes through the multi-layer semiconductor structure 12 and exits LED 10 through surface 16 at angle 468 in the Z-Y plane. Light ray 460 is transmitted by base 417d of prism 410d and is directed to side 412d at angle 470. If angle 468 is a relatively large angle as shown in FIG. 5D, then angle 470 can be less than the critical angle and light ray 460 will be transmitted by surface 412d. Angle 468 can be a large angle if, for example, reflecting layer 14 is a diffuse reflector or if the multi-layer semiconductor structure 12 scatters light. Light ray 460 exits side 412d and exits the illumination system 400 at angle 5D in the Z-Y plane. Because of the refraction of light ray 460 at base 417d and side 412d, angle 472 is less than angle 468.

Light ray 450 illustrates that internally generated light emitted from LED 10 at large angles in a first angular range is transmitted by the array of prisms 402, but exits the array at angles in the Z-Y plane that smaller than the initial emission angles from LED 10. Light rays that undergo total internal reflection inside the array of prisms are recycled by the array back to LED 10. Overall, the array of prisms transmits a first portion of the internally generated light in the Z-Y plane with a second angular range, smaller than the first angular range, and reflects a second portion of the internally generated light back to LED 10.

The array of prisms 302 in illumination system 300 reduces the angular range of light transmitted by the array in the Z-X plane. The array of prisms 402 in illumination system 400 reduces the angular range of light transmitted by the array in the Z-Y plane. It is also possible to reduce the angular range of light in all directions relative to the Z axis by using two arrays of prisms, one array with the long axes of the prisms parallel to the Y axis and one array with the long axes of the prisms parallel to the X-axis. Such an embodiment is illustrated by illumination system 500.

Another embodiment of this invention is illumination system 500 illustrated in FIGS. 6A-6F. Illumination system 500 is comprised of LED 10 and a partially reflecting optical element 504. LED 10 emits internally generated light over a first angular range. In this embodiment, the partially reflecting optical element 504 is comprised of two arrays of prisms, a first array of prisms 302 and a second array of prisms 402. In FIGS. 6A-6F, the first array of prisms 302 is comprised of prisms 310a, 310b and 310c. The second array of prisms 402 is comprised of prisms 410d, 410e and 410f. It is also within the scope of this invention that the first array of prisms 302 and the second array of prisms 402 may each be comprised of two prisms or more than three prisms. The structure and function of the first array of prisms 302 and the second array of prisms 402 have been described previously.

The first array of prisms 302 and the second array of prisms 402 are arranged such that the first array of prisms 302 is substantially perpendicular to the second array of prisms 402. In FIGS. 6A-6F, the first array of prisms 302 is aligned with the long axes of the prisms parallel to the Y axis. The second array of prisms 402 is aligned with the long axes of the prisms parallel to the X axis.

In illumination system 500, the bases of the prisms in the first array of prisms 302 are proximal to the emitting surface 16 of the LED 10. Preferably there is an air gap between the bases of the first array of prisms 302 and emitting surface 16. The apexes of the prisms in the first array of prisms 302 are distal from the emitting surface 16 of the LED 10.

The bases of the prisms in second array of prisms 402 are proximal to the apexes of the prisms in the first array of prisms 302. The bases of the prisms in the second array of prisms 402 may touch the apexes of the prisms of the first array of prisms 302 or there may be an air gap between the two arrays. The apexes of the prisms in the second array of prisms 402 are distal from the apexes of the prisms of the first array of prisms 302.

Light is internally generated by the LED 10 and emitted through the surface 16 of the LED. The emitted light is incident upon the bases of the first array of prisms 302.

The first array of prisms 302 transmits a first portion of the internally generated light emitted by LED 10 and reflects via total internal reflection a second portion of the internally generated light back to LED 10 in a similar manner as illustrated for illumination system 300 in FIGS. 4A-4D. The second array of prisms 402 transmits a first portion of light transmitted by the first array of prisms 302. The second array of prisms 402 reflects via total internal reflection a second portion of the light transmitted by the first array of prisms 302 back through the first array of prisms 302 to LED 10. Light that is recycled back to LED 10 by the first array of prisms 302 and by the second array of prisms 402 can reflect from reflecting layer 14 of LED 10 and be redirected back toward the two arrays of prisms. The recycled light that reflects from LED 10 can increase the effective brightness of LED 10.

If LED 10 of illumination system 500 emits internally generated light with a first angular range in both the Z-X plane and the Z-Y plane, the first array of prisms 302 reduces the angular range of the transmitted light in the Z-X plane but not in the Z-Y plane. Conversely, the second array of prisms 402 reduces the angular range of the transmitted light in the Z-Y plane but not in the Z-X plane. Partially reflecting optical element 504, consisting of both the first array of prisms 302 and the second array of prisms 402, reduces the angular range of the transmitted light in all directions including both the Z-X plane and the Z-Y plane. If the first angular distribution of LED 10 is Lambertian with a first angular range of approximately 120 degrees, preferably the second angular range exiting the two arrays of prisms is less than 100 degrees. More preferably the second angular range is less than 90 degrees. An exemplary array of prisms that can be used for both the first array of prisms 302 and the second array of prisms 402 is BEF™ film produced by 3M Corporation.

Figure 6A:
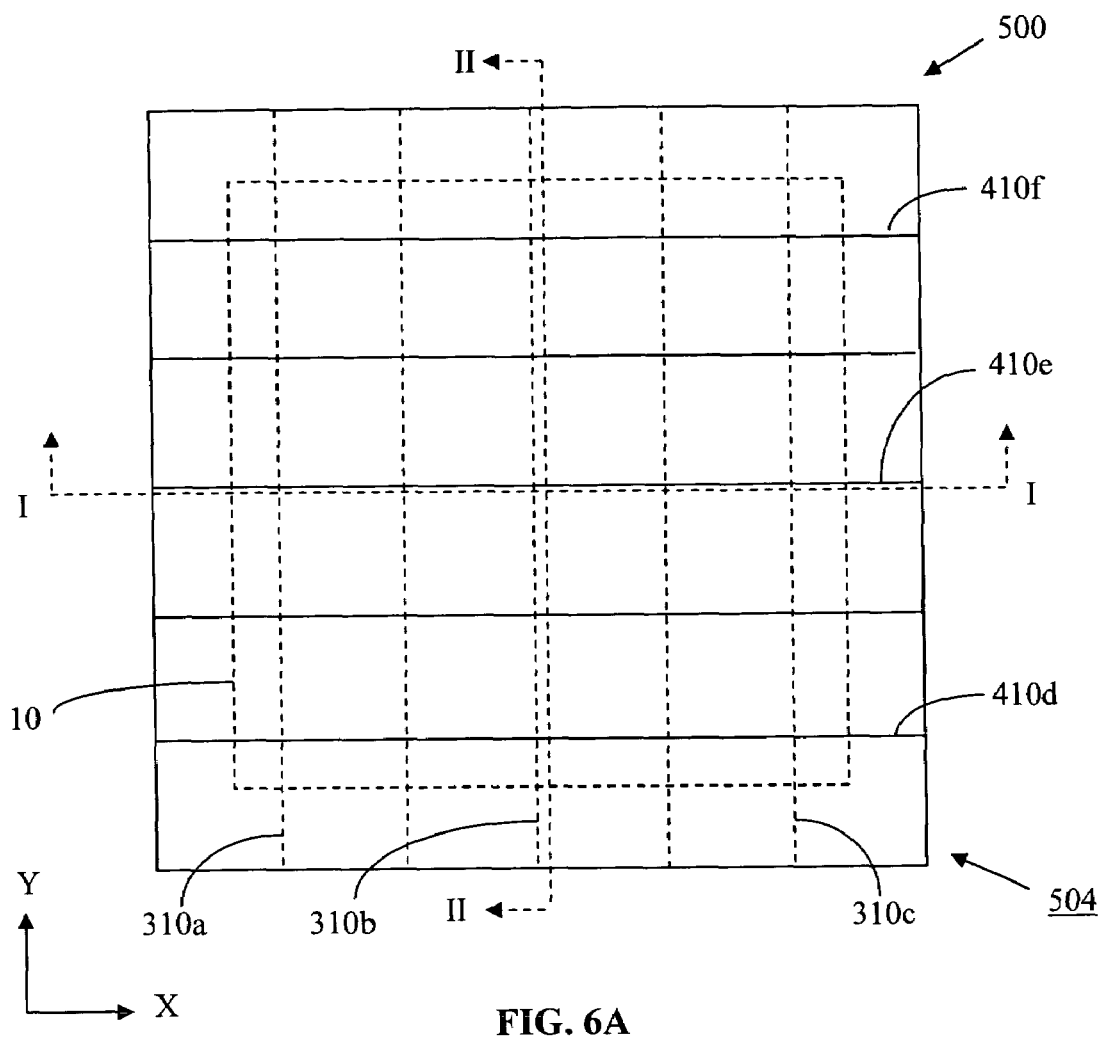
FIG. 6A is a plan view of another embodiment of this invention incorporating two orthogonal arrays of prisms.
Figure 6B:
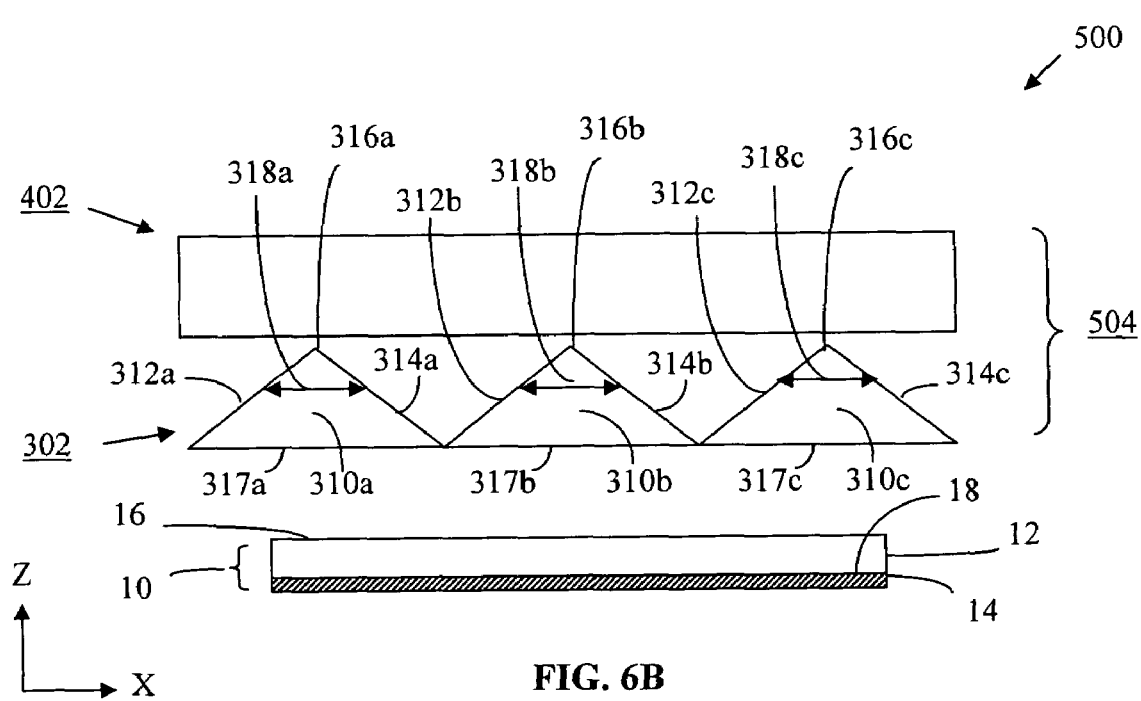
FIG. 6B is a cross-sectional view along the I-I plane illustrated in FIG. 6A.
Figure 6C:
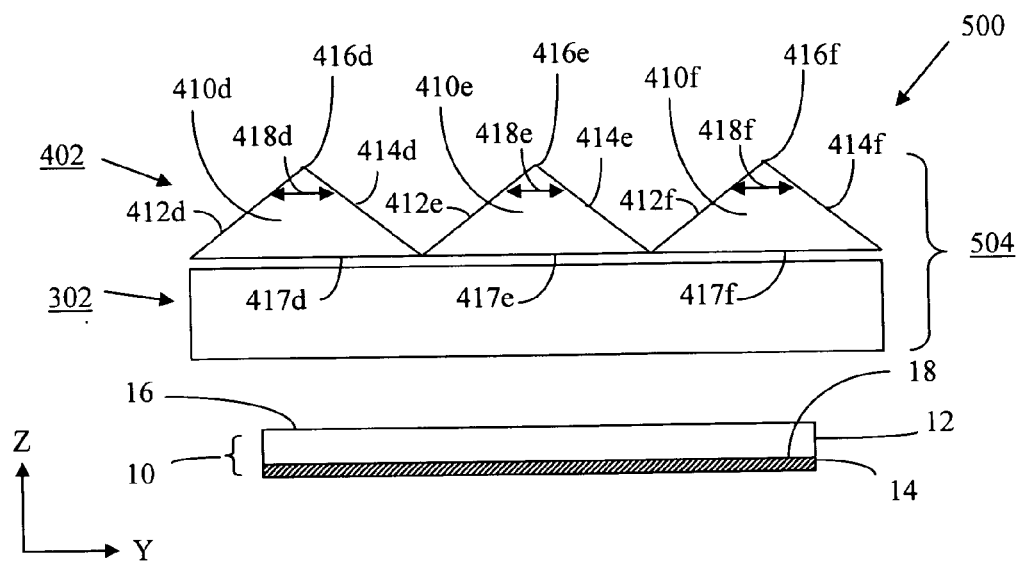
FIG. 6C is a cross-sectional view along the II-II plane illustrated in FIG. 6A.
Figure 6D:
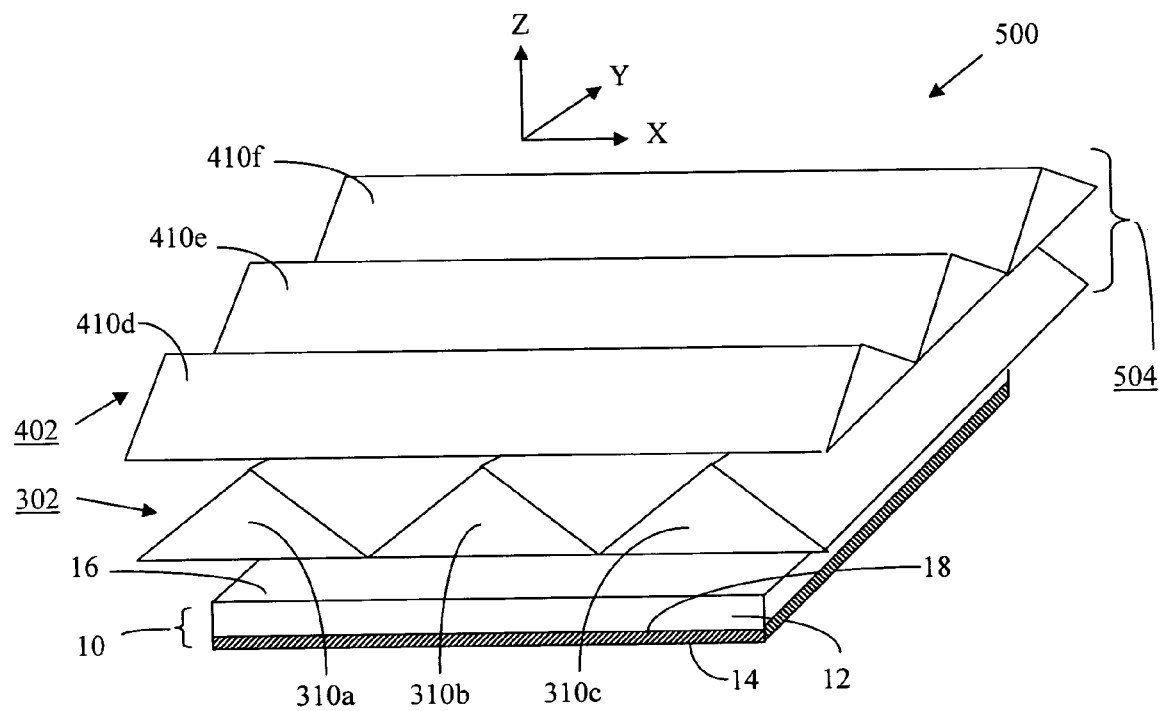
FIG. 6D is a perspective view of the embodiment illustrated in FIG. 6A.
Figure 6E:
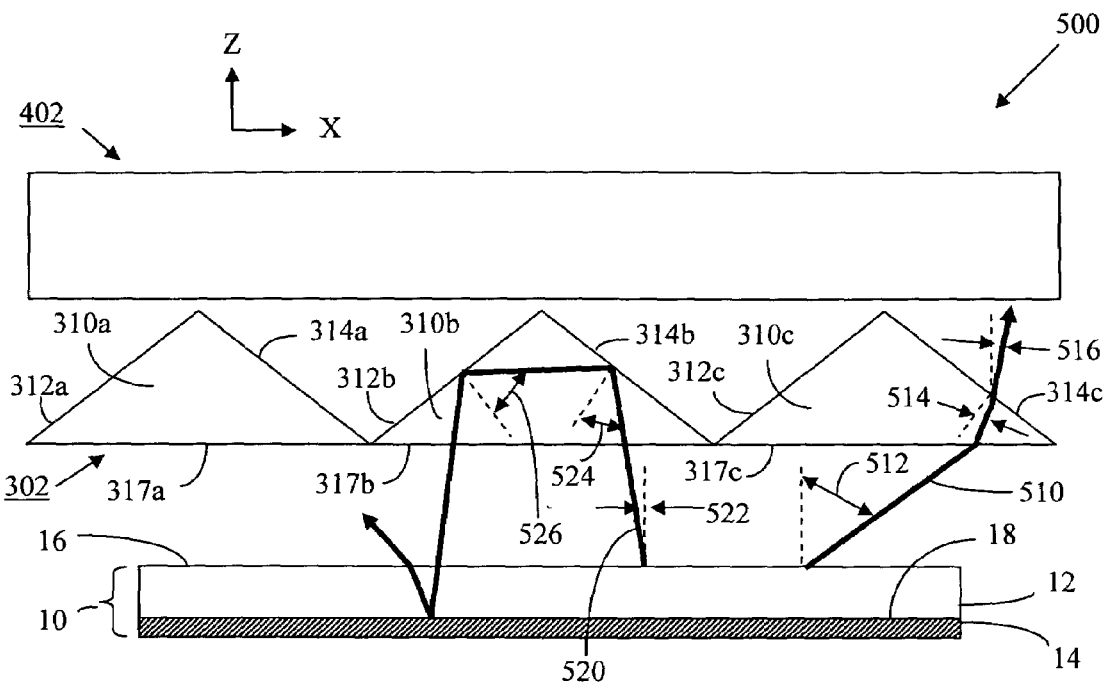
FIG. 6E is an expanded view of FIG. 6B.
Figure 6F:
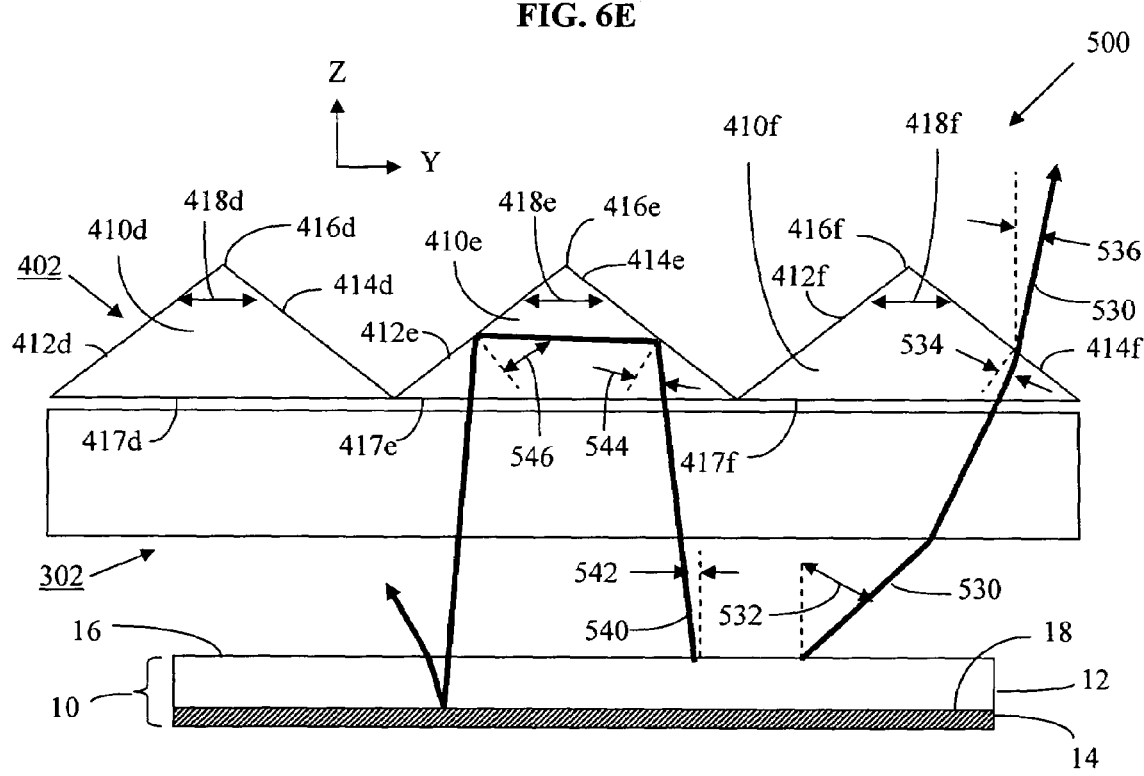
FIG. 6F is an expanded view of FIG. 6C.

FIG. 6A is a plan view of illumination system 500 viewed from above. FIG. 6B is a Z-X cross-sectional side view along the I-I plane indicated in FIG. 6A. FIG. 6C is a Z-Y cross-sectional side view along the II-II plane indicated in FIG. 6A. FIG. 6D is a perspective view. FIG. 6E is an expanded view of FIG. 6B. FIG. 6F is an expanded view of FIG. 6C.

Internally generated light emitted by LED 10 in illumination system 500 can be either transmitted by the first array of prisms 302 to the second array of prisms 402 or can undergo total internal reflection by the first array of prisms 302 and directed back to LED 10. Light rays 510 and 520 in FIG. 6E illustrate the operation of the array of prisms 302 in illumination system 500.

Multi-layer semiconductor structure 12 emits light ray 510 through surface 16 at angle 512 and directed towards prism 310c of the first array of prisms 302. Light ray 510 enters prism 310c through base 317c and is directed to surface 314c at angle 514. Since angle 514 is less than the critical angle, light ray 510 will be transmitted through surface 314c. Light ray 510 exits surface 314c of prism 310c at angle 516, measured relative to the z-axis. Due to the refraction of light ray 510 at base 317c and side 314c, angle 516 is less than angle 512. Light ray 510 exits prism 310c within a second angular range in the Z-X plane that is smaller than the first angular range of the internally generated light emitted by LED 10. Light ray 510 is directed to the second array of prisms 402. Depending on the angle that light ray 510 makes with the Z-Y plane (not shown), light ray 510 will be either transmitted by the second array of prisms 402 or will undergo total internal reflection by the second array of prisms 402 and be directed back through the first array of prisms 302 to LED 10.

Multi-layer semiconductor structure 12 of illumination system 500 emits light ray 520 through surface 16 at angle 522 in the Z-X plane. Angle 522 is within a first angular range. Light ray 520 enters prism 310b through base 317b and is directed to surface 314b at angle 524. Since angle 524 is greater than the critical angle, light ray 520 will undergo total internal reflection by surface 314b. Light ray 520 is directed to surface 312b at angle 526. Angle 526 is greater than the critical angle. Light ray 520 will undergo total internal reflection from surface 312b and be directed back to base 317b. Light ray 520 is directed to base 317b at less than the critical angle, passes through base 317b and is directed toward LED 10. Light ray 520 enters LED 10 through surface 16, passes through the multi-layer semiconductor structure 12, is reflected by reflecting layer 14, again passes through the multi-layer semiconductor structure 12, exits LED 10 through surface 16 and is directed toward the first array of prisms 302. Depending on the angular direction that light ray 520 makes with surface 16, light ray 520 may be transmitted or reflected by the first array of prisms 302 and the second array of prisms 402.

Internally generated light emitted by LED 10 that is transmitted by the first array of prisms 302 to the second array of prisms 402 can then either be transmitted by the second array of prisms 402 or can undergo total internal reflection by the second array of prisms 402 and be directed back through the first array of prisms 302 to LED 10. If light ray 510 that is transmitted by the first array of prisms at angle 516 in the Z-X plane is also transmitted by the second array of prisms 402, then the direction of light ray 510 in the Z-X plane will be substantially unchanged by the transmission through the second array of prisms 402.

Light rays 530 and 540 in FIG. 6F illustrate the operation of the second array of prisms 402 in illumination system 500. Multi-layer semiconductor structure 12 emits light ray 530 through surface 16 at angle 532 and towards the first array of prisms 302. Light ray 530 has the appropriate initial angle to pass through the first array of prisms 302. Light ray 530 is directed to base 417f of prism 410f in the second array of prisms 402. Light ray 530 passes through base 417f and is directed to side 414f at angle 534. Since angle 534 is less than the critical angle, light ray 530 will be transmitted by side 414f of prism 410f. Since light ray 530 is refracted by base 417f and side 414f, light ray 530 exits illumination system 500 at angle 536 that is less than angle 532.

Multi-layer semiconductor structure 12 emits light ray 540 through surface 16 at angle 542 and directed towards the first array of prisms 302. Light ray 540 has the appropriate initial angle to pass through the first array of prisms 302. Light ray 540 is directed to base 417e of prism 410e. Light ray 540 passes through base 417e and is directed to side 414e at angle 544. Since angle 544 is greater than the critical angle, light ray 540 undergoes total internal reflection and is directed to side 412e at angle 546. Since angle 546 is greater than the critical angle, light ray 540 undergoes total internal reflection and is directed through base 417e. Light ray 540 passes through the first array of prisms 302, reenters LED 10 through surface 16. Light ray 540 passes through the multi-layer semiconductor structure 12, is reflected by reflecting layer 14, again passes through the multi-layer semiconductor structure 12, exits LED 10 through surface 16 and is directed towards the first array of prisms 302. Depending on the angular direction that light ray 540 makes with surface 16, light ray 540 may be transmitted or reflected by the first array of prisms 302 and the second array of prisms 402.

Overall, the first array of prisms 302 and the second array of prisms 402 transmit a first portion of the internally generated light emitted by LED 10. The transmitted light has a second angular range that is smaller than the first angular range emitted by LED 10. The first array of prisms 302 and the second array of prisms 402 reflect a second portion of the internally generated light back to LED 10.

Figure 7A:
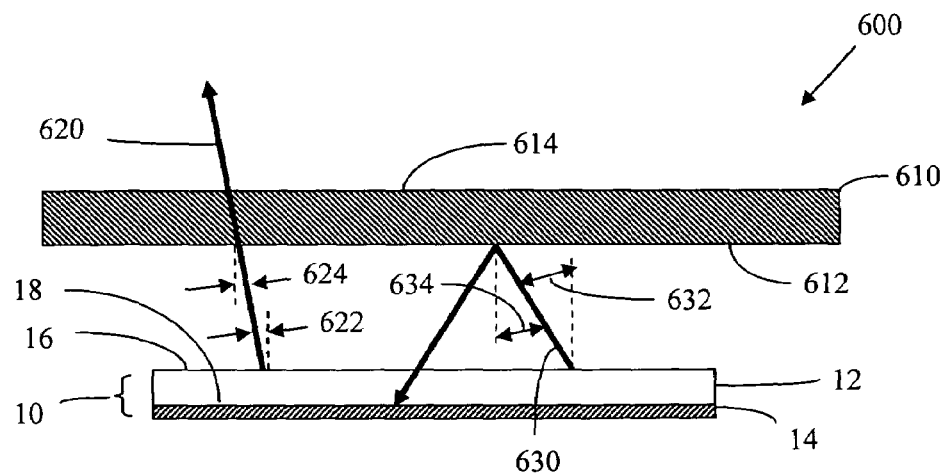
FIG. 7A is a cross-sectional view of another embodiment of this invention incorporating a bandpass filter.

FIG. 7A illustrates a cross-sectional view of another embodiment of this invention denoted as illumination system 600. Illumination system 600 is comprised of LED 10 and a bandpass filter 610. LED 10 is comprised of a multi-layer semiconductor structure 12 and a reflecting layer 14. LED 10 emits internally generated light from surface 16 over a first angular range.

Bandpass filter 610 is a partially reflecting optical element incorporating a multilayer dielectric coating. Bandpass filter 610 has an input surface 612 proximal to the output surface 16 of LED 10 and an output surface 614 distal from surface 16. In FIG. 7A, there is an air gap between LED 10 and bandpass filter 610. However, an air gap is not required. The bandpass filter 610 may be fabricated directly on surface 16 of LED 10. Also in FIG. 7A, the bandpass filter 610 is oriented parallel to the output surface 16 of LED 10, but the parallel orientation is not required if there is an air gap between the bandpass filter 610 and the output surface 16 of LED 10.

Figure 7B:
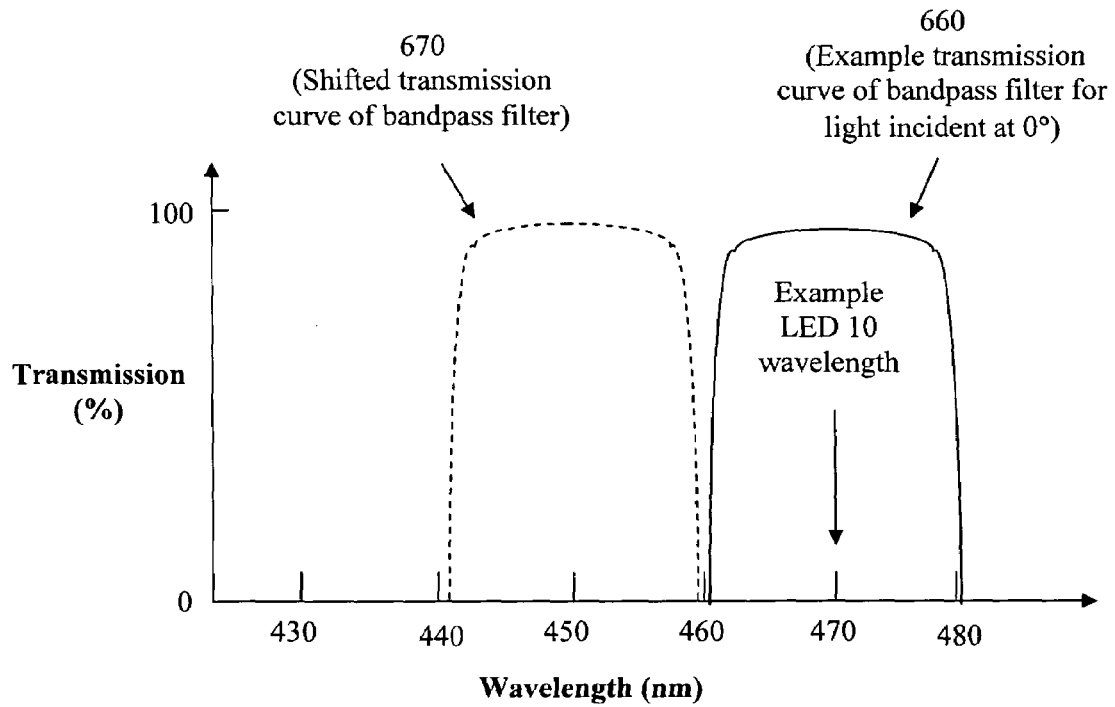
FIG. 7B illustrates example transmission spectra of a bandpass filter as a function of wavelength for two incident angles.

The bandpass filter 610 transmits a narrow range of wavelengths in the visible spectrum and reflects other visible wavelengths of light. Referring to FIG. 7B, assume, for example, that LED 10 emits light at 470 nm. Curve 660 in FIG. 7B is a representative curve for the transmission of an appropriate bandpass filter 610 for light incident on the bandpass filter at zero degrees. The incident angle is measured from a line perpendicular to the plane of the bandpass filter. The width of the transmission curve in this example is approximately 20 nanometers, but the width can be more or less than 20 nanometers. If internally generated light emitted by LED 10 is incident on the bandpass filter 610 at an angle of zero degrees or thereabouts, bandpass filter 610 will transmit the internally generated light. However, for light incident at other angles, the transmission curve for bandpass filter 610 shifts to shorter wavelengths. For example, curve 670 is a shifted transmission curve for bandpass filter 610 when light is incident at angle 634. As a result, bandpass filter 610 transmits light incident at small angles less than a cutoff angle. For incident angles greater than the cutoff angle, the incident light will be reflected.

Light rays 620 and 630 illustrate the operation of illumination system 600. Multi-layer semiconductor structure 12 emits light ray 620 through surface 16 at angle 622. Light ray 620 is directed to the input surface 612 of bandpass filter 610 at angle 624. Angle 624 is a small angle that is less than the cutoff angle. Light ray 620 is transmitted by the bandpass filter 610 and exits illumination system 600.

Multi-layer semiconductor structure 12 emits light ray 630 through surface 16 at angle 632. Light ray 630 is directed to the input surface 612 of bandpass filter 610 at angle 634. Light ray 630 is reflected by bandpass filter 610 since angle 634 is larger than the cutoff angle. Bandpass filter 610 thereby restricts the angular output of the illumination system 600 to a second angular range that is less than the first angular range of LED 10.

FIGS. 8A-8D, 9A-9B, 10A-10E and 11A-11D are embodiments of this invention that further comprise a light recycling envelope 702. Light recycling envelope 702 encloses LED 10 and has an output aperture 704. The inside surfaces 706 of the light recycling envelope 702 are reflective and may be specular reflectors or diffuse reflectors. Preferably inside surfaces 706 are diffuse reflectors. The reflectivity of inside surfaces 706 is preferably at least 80%. More preferably, the reflectivity of inside surfaces 706 is at least 90%. Most preferably, the reflectivity of inside surfaces 706 is at least 95%. The inside surfaces 706 reflect and recycle light emitted by LED 10 back to LED 10. The recycled light reflects from reflecting layer 14 of LED 10 and increases the effective brightness of LED 10.

Light recycling envelope 702 is shown enclosing LED 10. In general, however, more than one LED may be enclosed in one light recycling envelope. Preferably, as much as possible of the inside area of light recycling envelope, with the exception of the output aperture, is covered by LEDs. The area of the remaining inside surfaces 706 not covered by LEDs is preferably minimized in order to minimize the total inside area of the light recycling envelope.

If the area of the output aperture is less than the total emitting area of the one or more LEDs inside the light recycling envelope, it is possible for the brightness of the light exiting the light recycling envelope to be brighter than the intrinsic brightness of an individual LED in the absence of light recycling. The actual output brightness depends on the reflectivity of LED 10 and the reflectivity of the inside surfaces 706. When the reflectivity of either element is less than 100%, some of the light inside the light recycling envelope will be lost to absorption and will not exit the output aperture 704.

A fraction of the internally generated light emitted by LED 10 will exit output aperture 704 over a first angular range. The first angular range exiting the output aperture 704 may be quite large. For example, in some cases the light output is substantially Lambertian with an angular range of 120 degrees. For illumination system applications that require low values of etendue, it would be desirable to restrict the light exiting the illumination system to a second angular range, smaller than the first angular range, in order to reduce the etendue of the illumination system.

FIGS. 8A-8D illustrate illumination system 700, which is comprised of LED 10, a light recycling envelope 702 that has an output aperture 704 and a four-sided pyramid 110 positioned over the output aperture 704. LED 10 emits internally generated light and has a total emitting area. A fraction of the internally generated light exits output aperture 704 in a first angular range. Preferably the area of the output aperture is less than the total emitting area of LED 10. As discussed above, it is also within the scope of this invention that that the light recycling envelope may contain more than one LED, wherein the multiple LEDs have a total emitting area. If the light recycling envelope incorporates multiple LEDs, preferably the area of the output aperture 704 is less than the total emitting area of the multiple LEDs.

Figure 8A:
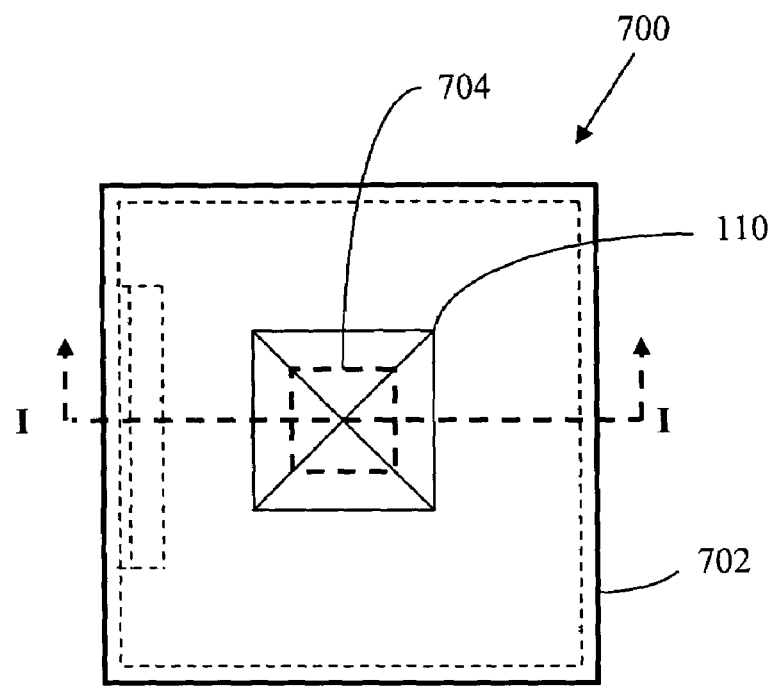
FIG. 8A is a plan view of another embodiment of this invention that incorporates a light recycling envelope and a four-sided pyramid.
Figure 8B:
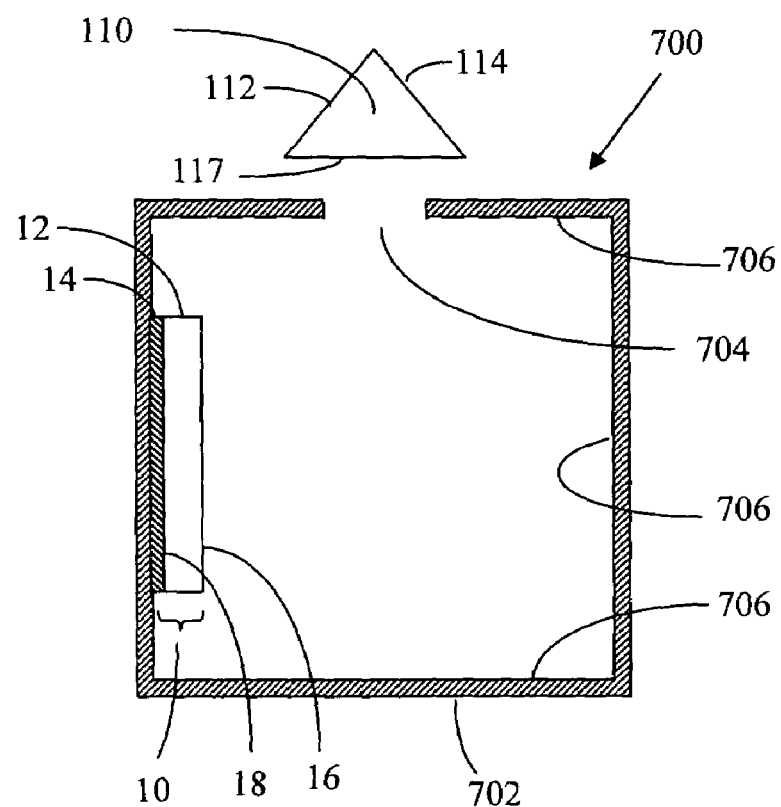
FIG. 8B is a cross-sectional view along the I-I plane illustrated in FIG. 8A.
Figure 8C:
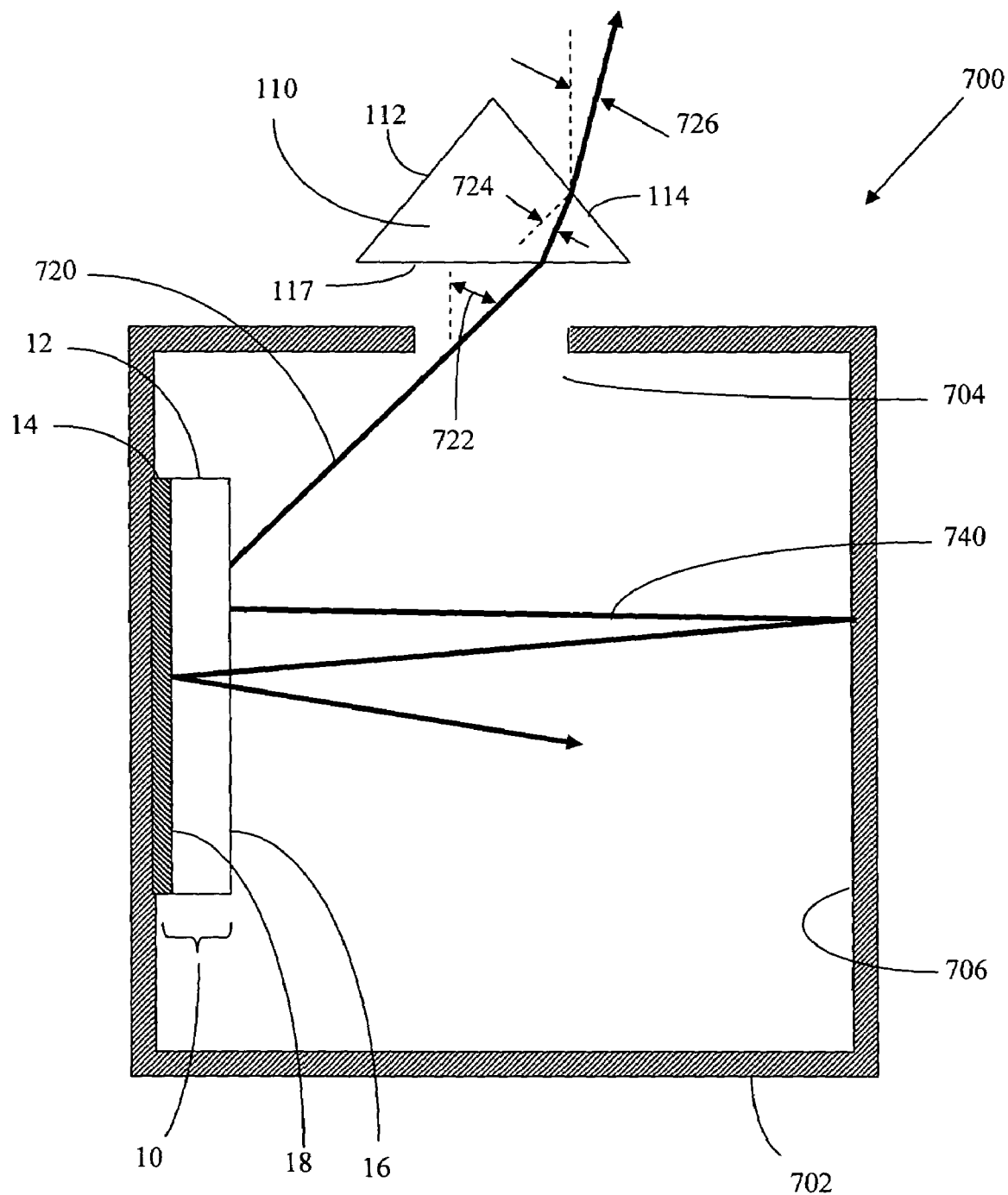
FIGS. 8C and 8D are expanded views of FIG. 8B.
Figure 8D:
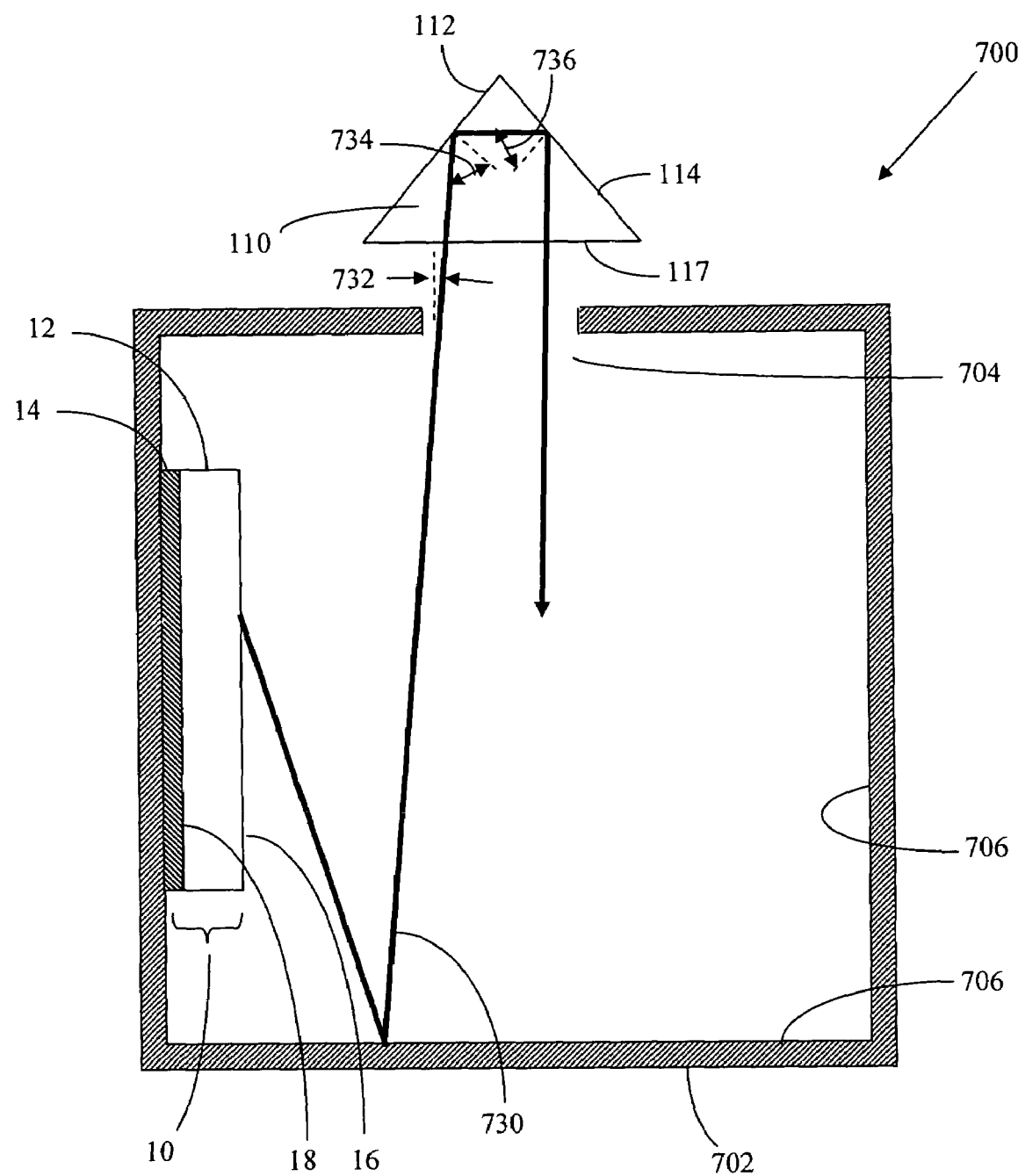

FIG. 8A is a plan view of illumination system 700 viewed from above. FIG. 8B is a cross-sectional side view along the I-I plane illustrated in FIG. 8A. FIGS. 8C and 8D are expanded views of FIG. 8B.

Pyramid 110 has been described previously. The base 117 of pyramid 110 is proximal to output aperture 704 and is in the light optical path of light exiting the light output aperture 704. Pyramid 110 restricts the light exiting illumination system 700 to a second angular range, smaller than the first angular range.

Light rays 720, 730 and 740 in FIGS. 8C and 8D illustrate the operation of illumination system 700. Multi-layer semiconductor structure 12 emits light ray 720 through surface 16. Light ray 720 exits the output aperture 704 at angle 722 and is incident on the base of pyramid 110. Angle 722 is within a first angular range. Light ray 720 is transmitted by base 117 and is directed to side 114 at angle 724. Since angle 724 is less than the critical angle, side 114 transmits light ray 720. Light ray 720 exits pyramid 110 and the illumination system 700 at angle 726, which is smaller than angle 722. Angle 726 is within a second angular range that is less than the first angular range of light exiting output aperture 704.

Multi-layer semiconductor structure 12 emits light ray 730 through surface 16. Light ray 730 is directed to an inside surface 706 of the light recycling envelope 702. Light ray 730 is reflected by the inside surface 706 and is redirected to the output aperture 704. Light ray 730 exits the output aperture at angle 732 and is directed to the base of pyramid 110. Angle 732 is within a first angular range. Light ray 730 passes through surface 117 and is directed to surface 112 at angle 734. Since angle 734 is greater than the critical angle, light ray 730 undergoes total internal reflection and is directed to side 114 at angle 736. Since angle 736 is greater than the critical angle, light ray 730 undergoes total internal reflection and is recycled back through surface 117 and back into the light recycling envelope through the output aperture 704. Light ray 730 can then be reflected one or more times inside the light recycling envelope and may eventually again exit again through output aperture 704, but at an angle that allows light ray 730 to be transmitted by pyramid 110.

Multi-layer semiconductor structure 12 emits light ray 740 through surface 16 and directed into the interior of the light recycling envelope a first time. Light ray 740 is reflected back to LED 10 by inside surfaces 706. Light ray 740 passes through surface 16 and the multi-layer semiconductor structure 12 and is reflected by reflecting layer 14. Light ray 740 passes through the multi-layer semiconductor structure 12 and surface 16 and enters the interior of the light recycling envelope a second time. The reflection of light ray 740 by the reflecting layer 14 increases the effective brightness of LED 10.

Figure 9A:
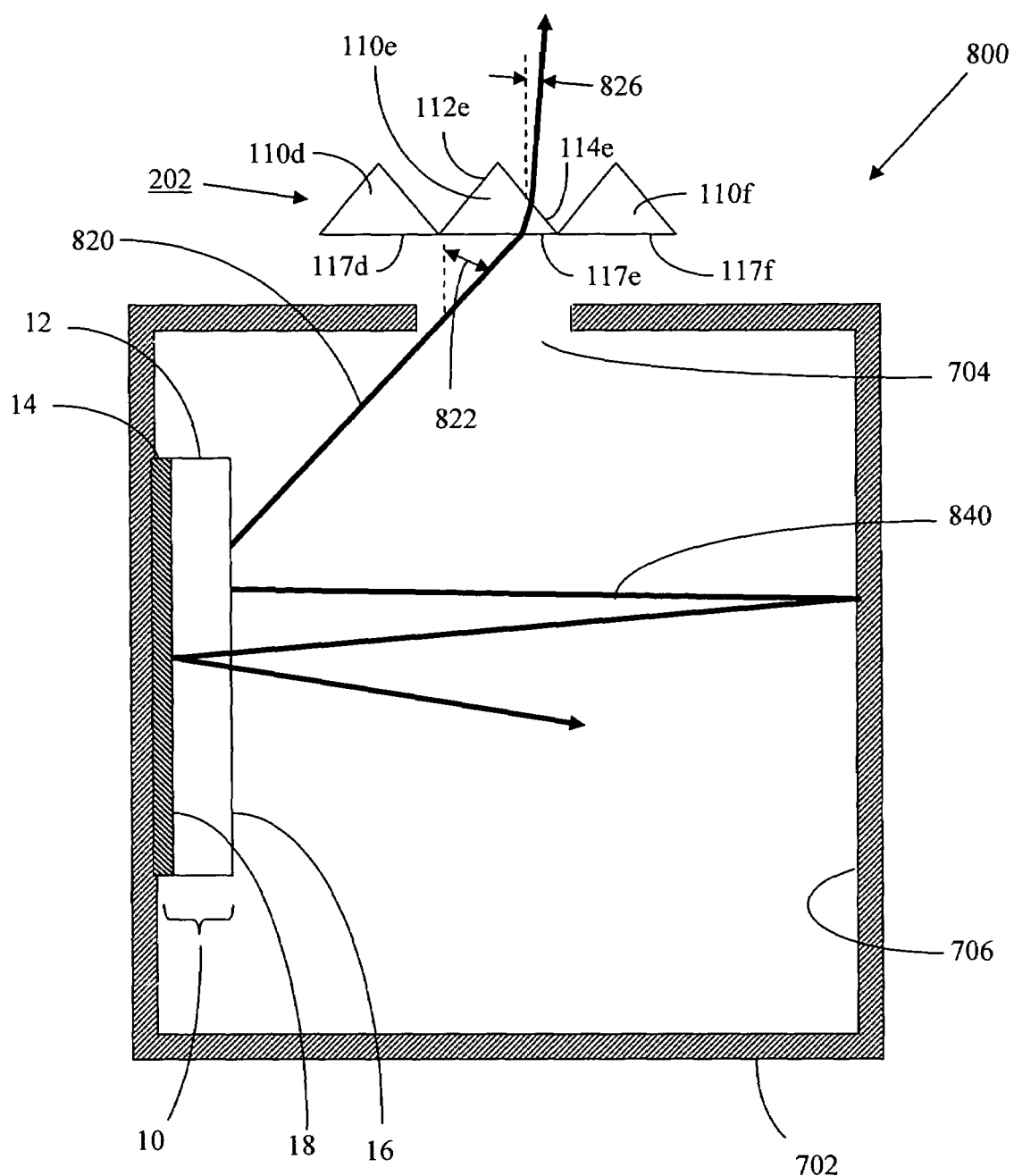
FIGS. 9A and 9B are cross-sectional views of another embodiment of this invention that incorporates a light recycling envelope and an array of four-sided pyramids.
Figure 9B:
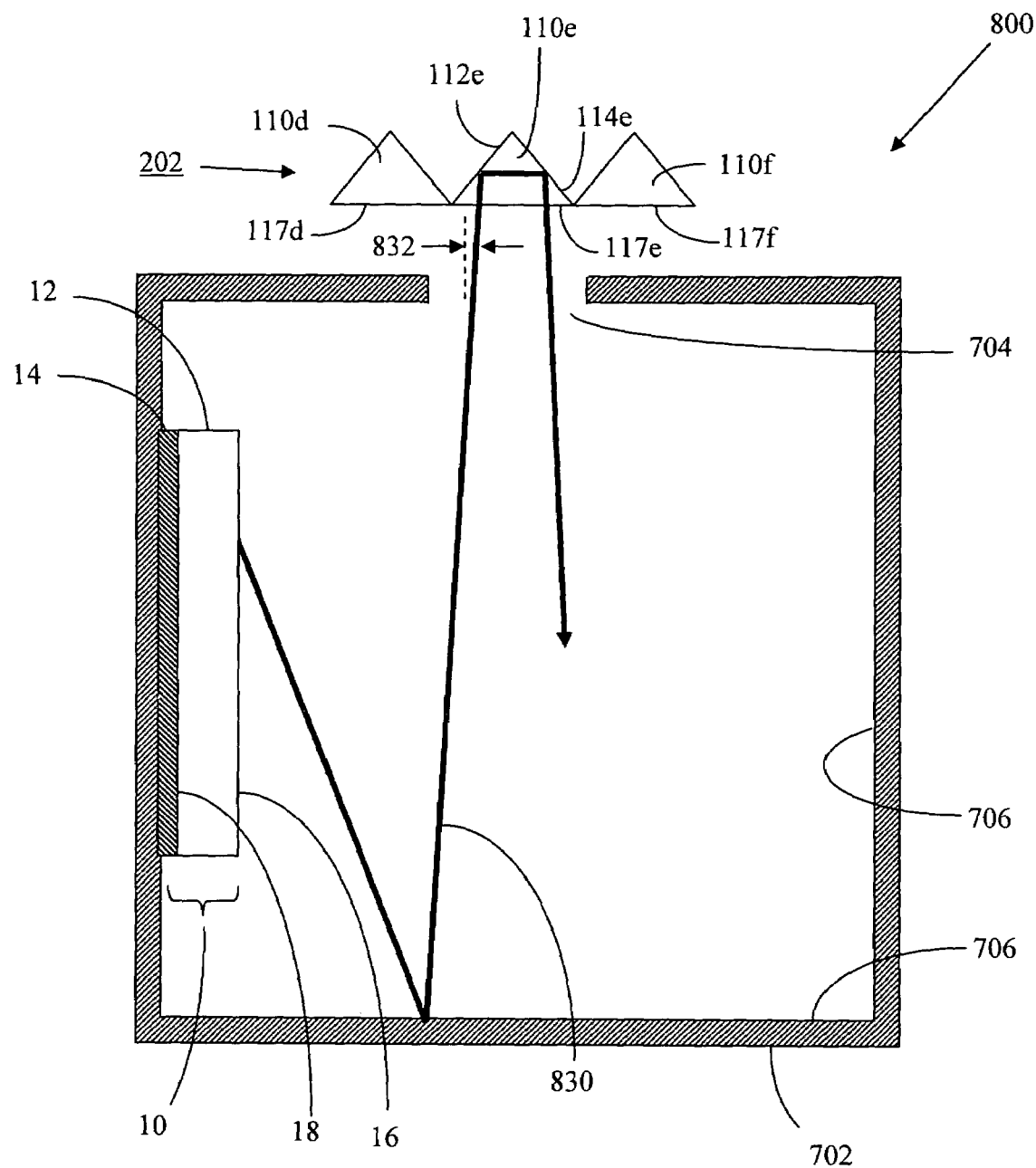

Illumination system 800 illustrated in cross section in FIGS. 9A and 9B is similar to illumination system 700 except that illumination system 800 incorporates an array of pyramids 202. Illumination system 800 is comprised of LED 10, a light recycling envelope 702 that has an output aperture 704 and a three-by-three array of pyramids 202 positioned over the output aperture 704. The three-by-three array of pyramids 202 has been described previously in illumination system 200. In the cross section shown in FIGS. 9A and 9B, three of the nine pyramids, pyramids 110*d*, 110*e* and 110*f*, are illustrated. A fraction of the internally generated light exits output aperture 704 in a first angular range.

Preferably the area of the output aperture 704 is less than the total emitting area of LED 10. As discussed above, it is also within the scope of this invention that that the light recycling envelope may contain more than one LED, wherein the multiple LEDs have a total emitting area. If the light recycling envelope incorporates multiple LEDs, preferably the area of the output aperture 704 is less than the total emitting area of the multiple LEDs.

The bases 117*d*, 117*e* and 117*f* of the array of pyramids 202 are proximal to output aperture 704 and is in the light optical path of light exiting the light output aperture 704. The array of pyramids 202 restricts the light exiting illumination system 800 to a second angular range, smaller than the first angular range.

Light rays 820, 830 and 840 in FIGS. 9A and 9D illustrate the operation of illumination system 800. Multi-layer semiconductor structure 12 emits light ray 820 through surface 16. Light ray 820 exits the output aperture 704 at angle 822 and is incident on the base 117*e* of pyramid 110*e*. Angle 822 is within a first angular range. Light ray 820 is transmitted by base 117*e* and is directed to side 114*e* at an angle less than the critical angle. Side 114*e* transmits light ray 820. Light ray 820 exits pyramid 110*e* and the illumination system 800 at angle 826. Angle 826 is smaller than angle 822 due to the refraction of light at surfaces 117*e* and 114*e*. Angle 826 is within a second angular range that is less than the first angular range of light exiting output aperture 704.

Multi-layer semiconductor structure 12 emits light ray 830 through surface 16 and directed to one of the inside surfaces 706 of the light recycling envelope 702. Light ray 830 is reflected by the inside surfaces 706 and is redirected to the output aperture 704. Light ray 830 exits the output aperture 704 at angle 832 and is directed to the base of pyramid 110*e*. Angle 832 is within a first angular range. Light ray 830 passes through surface 117*e* and is directed to surface 112*e*. Light ray 830 is directed to surfaces 112*e* and 114*e* at angles that are greater than the critical angle and undergoes total internal reflection at both surfaces. Light ray is recycled back through surface 117*e* and back into the light recycling envelope via the output aperture 704. Light ray 830 can then be reflected one or more times inside the light recycling envelope and may eventually again exit through output aperture 704, but at an angle that allows light ray 730 to be transmitted by the array of pyramids 202.

Multi-layer semiconductor structure 12 emits light ray 840 through surface 16 and directed into the interior of the light recycling envelope a first time. Light ray 840 is reflected back to LED 10 by inside surfaces 706. Light ray 840 passes through surface 16 and the multi-layer semiconductor structure 12 and is reflected by reflecting layer 14. Light ray 840 again passes through the multi-layer semiconductor structure 12 and surface 16 and enters the interior of the light recycling envelope a second time. The reflection of light ray 840 by the reflecting layer 14 increases the effective brightness of LED 10.

Another embodiment of this invention is illumination system 900 illustrated in FIGS. 10A-10E. Illumination system 900 is comprised of LED 10, a light recycling envelope 702 and a partially reflecting optical element 504. LED 10 emits internally generated light. A fraction of the internally generated light exits the output aperture 704 of the light recycling envelope 702 over a first angular range.

Preferably the area of the output aperture is less than the total emitting area of LED 10. As discussed above, it is also within the scope of this invention that that the light recycling envelope can contain more than one LED, wherein the multiple LEDs have a total emitting area. If the light recycling envelope incorporates multiple LEDs, preferably the area of the output aperture is less than the total emitting area of the multiple LEDs.

The light recycling envelope 702 and the partially reflecting optical element 504 have been described previously. The partially reflecting optical element 504 is comprised of two arrays of prisms, a first array of prisms 302 and a second array of prisms 402. The structure and function of the first array of prisms 302 and the second array of prisms 402 have been described previously.

The first array of prisms 302 and the second array of prisms 402 are arranged such that the first array of prisms 302 is substantially perpendicular to the second array of prisms 402. In FIGS. 10A-10E, the first array of prisms 302 is aligned with the long axes of the prisms parallel to the Y axis. The second array of prisms 402 is aligned with the long axes of the prisms parallel to the X axis.

In illumination system 900, the bases of the prisms in the first array of prisms 302 are proximal to the emitting surface 16 of the LED 10. Preferably there is an air gap between the bases of the first array of prisms 302 and emitting surface 16. The apexes of the prisms in the first array of prisms 302 are distal from the emitting surface 16 of the LED 10.

The bases of the prisms in second array of prisms 402 are proximal to the apexes of the prisms of the first array. The bases of the prisms in the second array of prisms 402 may touch the apexes of the prisms of the first array of prisms 302 or there may be an air gap between the two arrays. The apexes of the prisms in the second array of prisms 402 are distal from the apexes of the prisms of the first array of prisms 302.

The first array of prisms 302 transmits a first portion of the internally generated light exiting the light output aperture 704 and reflects via total internal reflection a second portion of the internally generated light back through the light output aperture 704 and back into the light recycling envelope. The second array of prisms 402 transmits a first portion of light transmitted by the first array of prisms 302. The second array of prisms 402 reflects via total internal reflection a second portion of the light transmitted by the first array of prisms 302 back through the first array of prisms 302, back through the light output aperture and into the light recycling envelope. Light that is recycled back into the light recycling envelope can then be reflected one or more times inside the light recycling envelope and may eventually exit again through output aperture 704. The recycled light that reflects from LED 10 can increase the effective brightness of LED 10.

If the internally generated light exits the output aperture 704 of illumination system 900 with a first angular range in both the Z-X plane and the Z-Y plane, the first array of prisms 302 reduces the angular range of the transmitted light in the Z-X plane but not in the Z-Y plane. Conversely, the second array of prisms 402 reduces the angular range of the transmitted light in the Z-Y plane but not in the Z-X plane. Partially reflecting optical element 504, consisting of both the first array of prisms 302 and the second array of prisms 402, reduces the angular range of the transmitted light in all directions including both the Z-X plane and the Z-Y plane. If the first angular distribution of light exiting the output aperture is Lambertian with a first angular range of approximately 120 degrees, preferably the second angular range exiting the two arrays of prisms is less than 100 degrees. More preferably the second angular range is less than 90 degrees. An exemplary array of prisms that can be used for both the first array of prisms 302 and the second array of prisms 402 is BEF™ film produced by 3M Corporation.

Figure 10A:
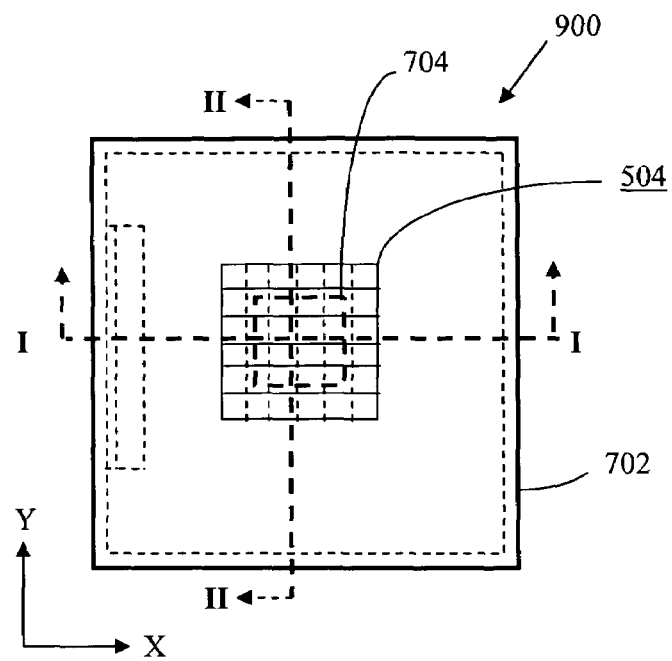
FIG. 10A is a plan view of another embodiment of this invention that incorporates a light recycling envelope and two orthogonal arrays of prisms.
Figure 10B:
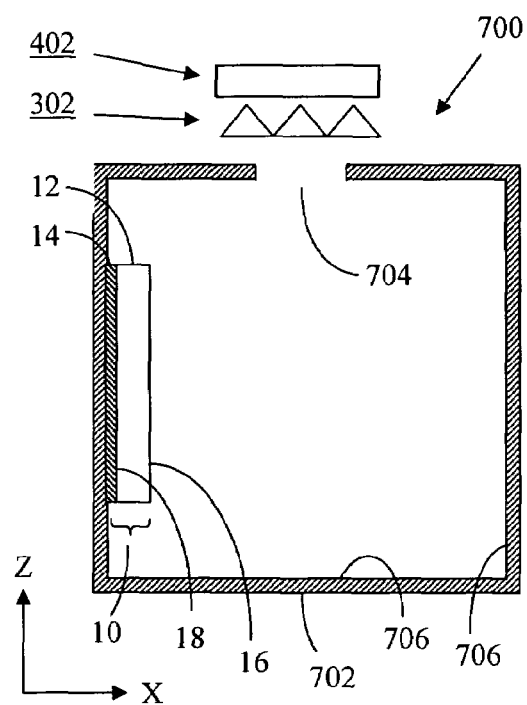
FIG. 10B is a cross-sectional view along the I-I plane indicated in FIG. 10A.
Figure 10C:
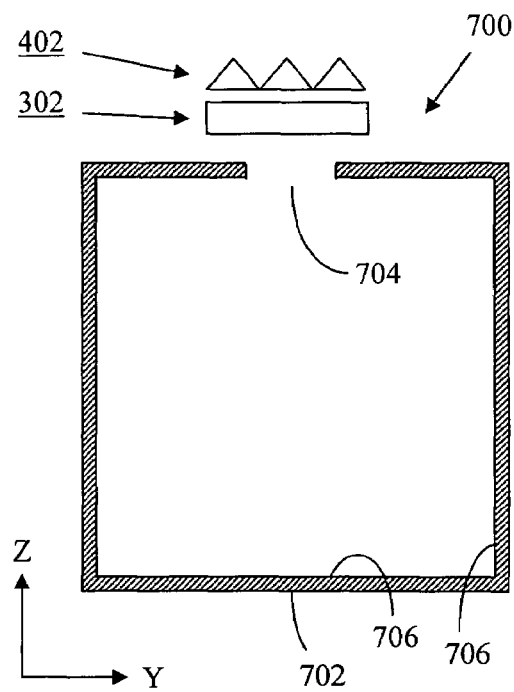
FIG. 10C is a cross-sectional view along the II-II plane indicated in FIG. 10A.
Figure 10D:
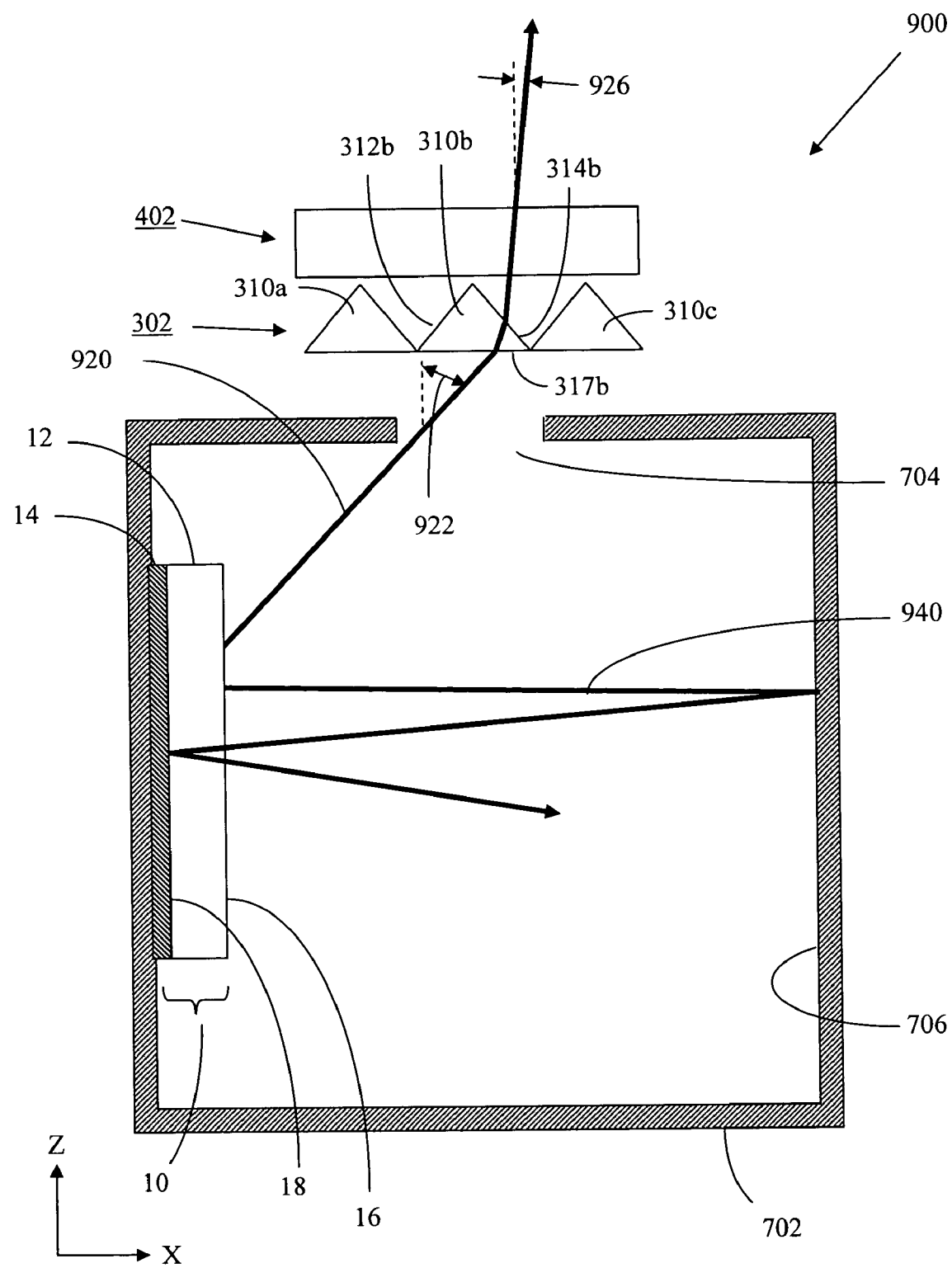
FIGS. 10D and 10E are expanded views of FIG. 10B.
Figure 10E:
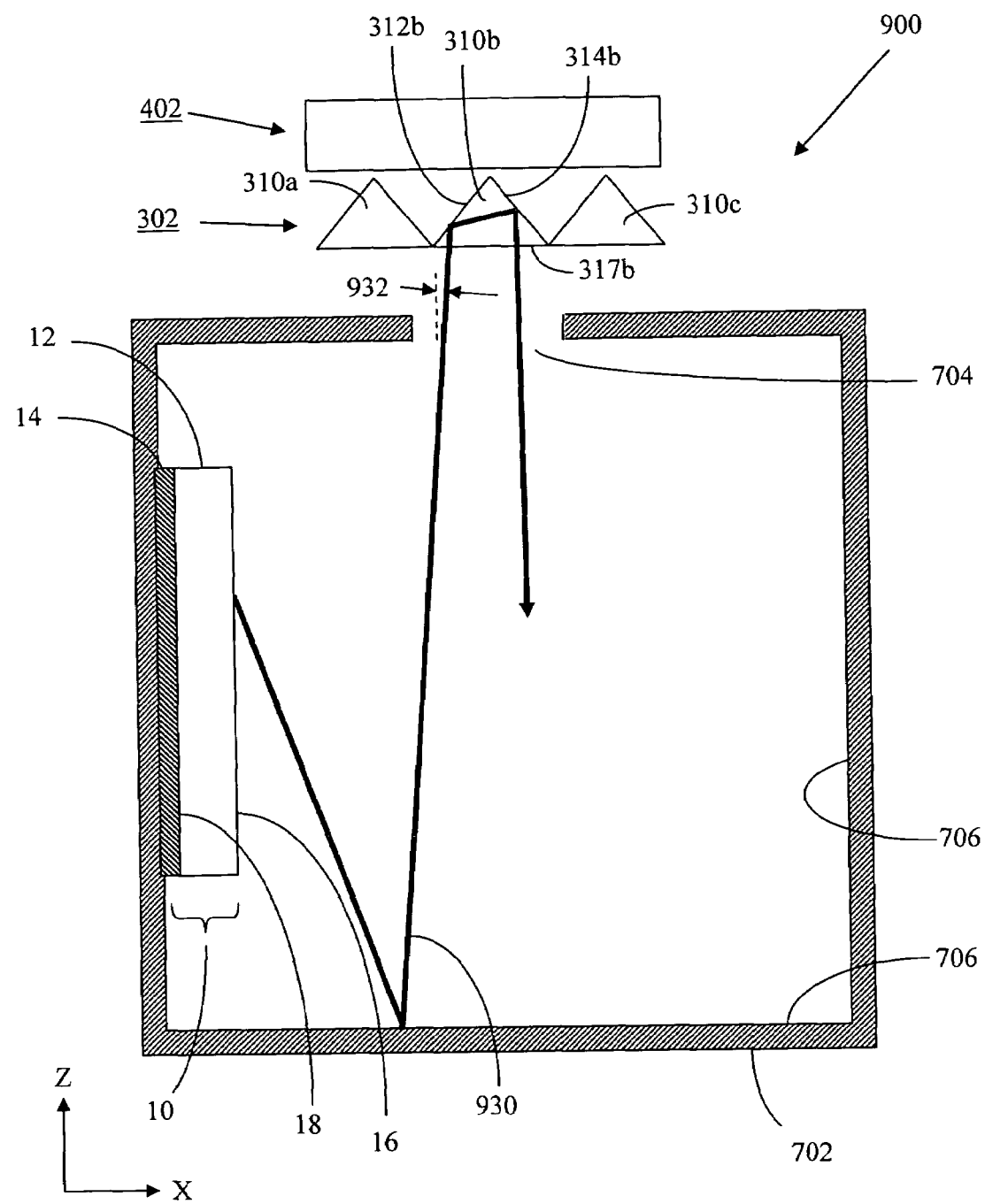

FIG. 10A is a plan view of illumination system 900 viewed from above in the X-Y plane. FIG. 10B is a cross-sectional Z-X side view along the I-I plane indicated in FIG. 10A. FIG. 10C is a cross-sectional Z-Y side view along the II-II plane indicated in FIG. 10A. FIGS. 10D and 10E are expanded views of FIG. 10B.

Light rays 920, 930 and 940 FIGS. 10D and 10E illustrate the operation of the array of prisms 302 in illumination system 900. The operation of the array of prisms 402 has been illustrated previously in illumination system 500 and will not be repeated for illumination system 900.

Multi-layer semiconductor structure 12 emits light ray 920 through surface 16. Light ray 920 is directed through the output aperture 704 at angle 922 in the Z-X plane. Angle 922 is within a first angular range. Light ray 920 enters prism 310b through base 317b and is directed to surface 314b. Light ray 920 strikes surface 314b at less than the critical angle and is transmitted to the second array of prisms 402. In this example, light ray 920 is transmitted by the second array of prisms 402 and exits illumination system 900 at angle 926 in the Z-X plane. Angle 926 is less than angle 922 and is within a second angular range.

Note that internally generated light that is transmitted by the first array of prisms 302 to the second array of prisms 402 can either be transmitted by the second array of prisms 402 or can undergo total internal reflection by the second array of prisms 402 and be directed back through the first array of prisms 302 and into the light recycling envelope. If light ray 920 that is transmitted by the first array of prisms in the Z-X plane is also transmitted by the second array of prisms 402, then the transmission angle in the Z-X plane will be substantially unchanged by the transmission through the second array of prisms 402.

Overall, the first array of prisms 302 and the second array of prisms 402 transmit a first portion of the internally generated light exiting the output aperture 704 of the light recycling envelope 702. The transmitted light has a second angular range that is smaller than the first angular range exiting the output aperture.

Multi-layer semiconductor structure 12 in illumination system 900 emits light ray 930 through surface 16. Light ray 930 is directed to an inside surface 706 where it is reflected. Inside surface 706 directs light ray 930 through output aperture 704 at angle 932. Angle 932 is within a first angular range. Light ray 930 enters prism 310b through base 317b at an angle such that light ray 930 undergoes total internal reflection at surfaces 312b and 314b. Light ray 930 is directed back through base 317b and is recycled back into the light recycling envelope 702 through output aperture 704.

Multi-layer semiconductor structure 12 emits light ray 940 through surface 16 and directed towards the inside surfaces 706 of the light recycling envelope 702. Light ray 940 is reflected by the inside surfaces 706 and directed back to LED 10. Light ray 940 passes through surface 16 of LED 10, passes though the multi-layer semiconductor structure 12 and is reflected by reflecting layer 14. Light ray 940 again passes through the multi-layer semiconductor structure 12 and surface 16 and reenters the interior of the light recycling envelope. The reflection of light ray 940 by LED 10 increases the effective brightness of LED 10.

Figure 11A:
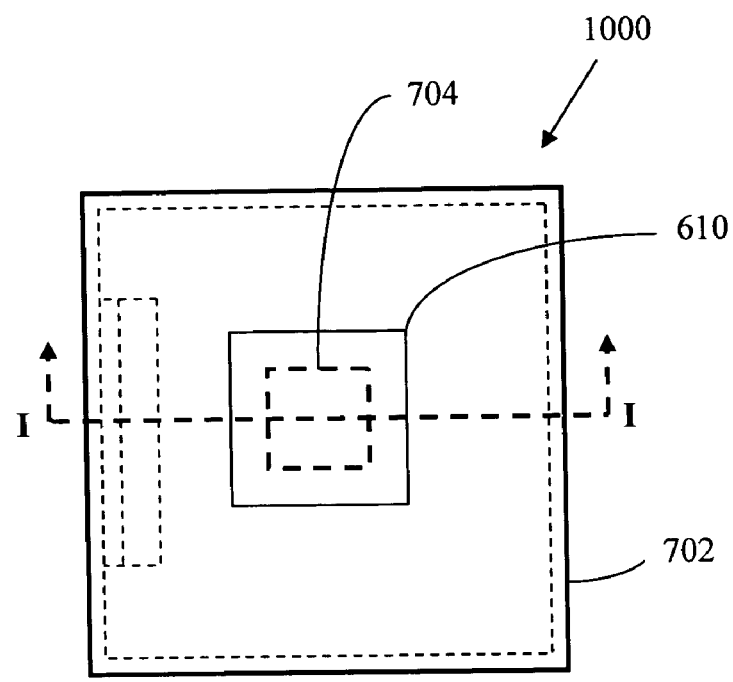
FIG. 11A is a plan view of another embodiment of this invention that incorporates a light recycling envelope and a bandpass filter.
Figure 11B:
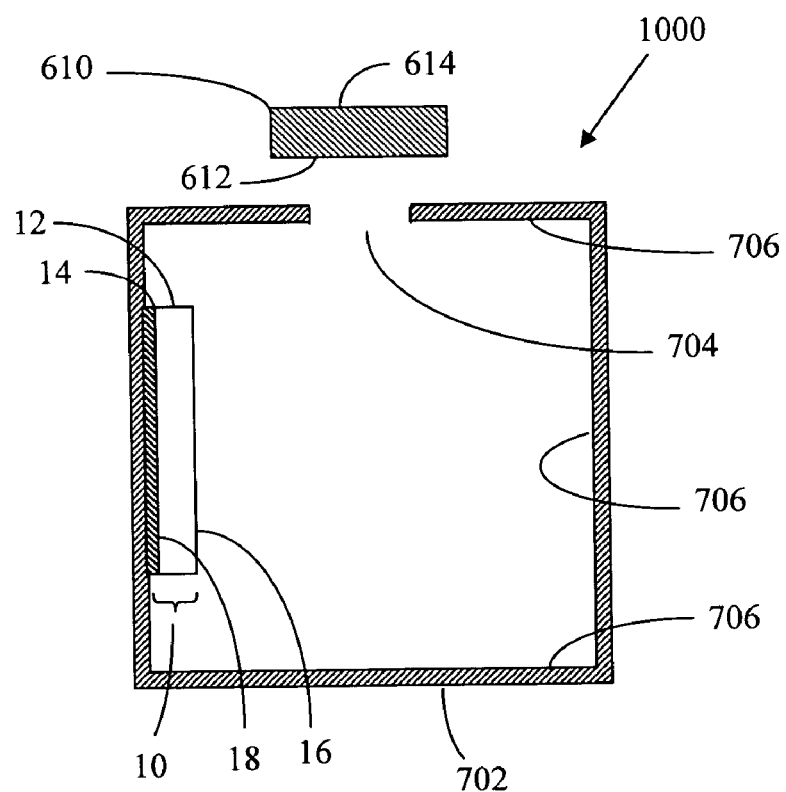
FIGS. 11B-11D are cross-sectional views along the I-I plane illustrated in FIG. 11A.
Figure 11C:
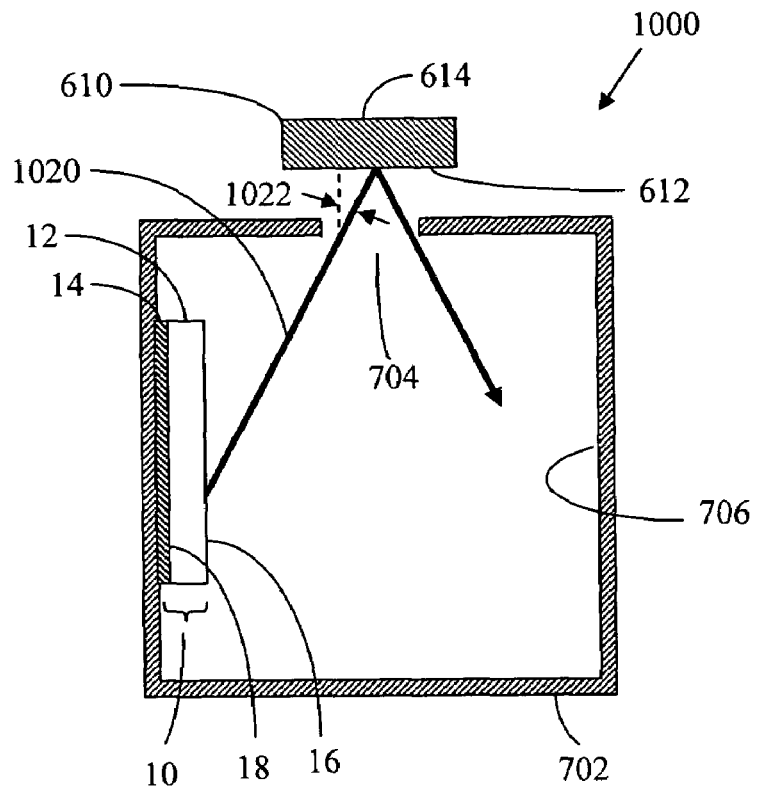
Figure 11D:
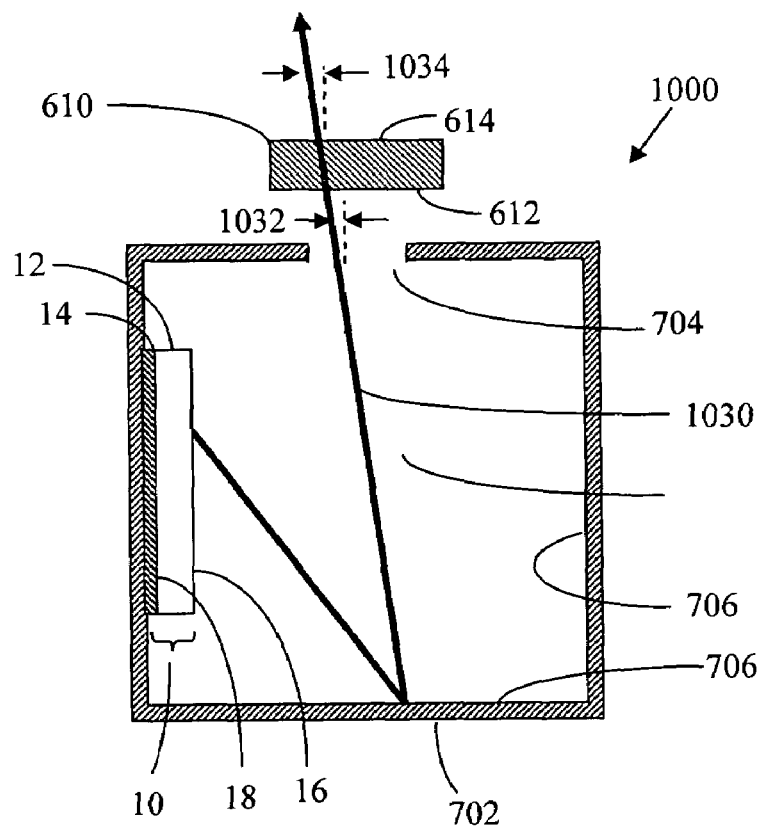

FIGS. 11-11D illustrate illumination system 1000, which is comprised of LED 10, a light recycling envelope 702 and a bandpass filter 610. Light recycling envelope 702 has an output aperture 704. A fraction of the internally generated light emitted by LED 10 exits output aperture 704 over a first angular range.

Preferably the area of the output aperture is less than the total emitting area of LED 10. As discussed above, it is also within the scope of this invention that that the light recycling envelope can contain more than one LED, wherein the multiple LEDs have a total emitting area. If the light recycling envelope incorporates multiple LEDs, preferably the area of the output aperture is less than the total emitting area of the multiple LEDs.

The characteristics and properties of bandpass filter 610 have been described previously for illumination system 600. Bandpass filter 610 is proximal to output aperture 704 and is in the light optical path of light exiting the light output aperture 704.

Bandpass filter 610 restricts the light exiting illumination system 1000 to a second angular range, smaller than the first angular range. Light rays 1020 and 1030 illustrate the operation of illumination system 1000.

Multi-layer semiconductor structure 12 emits light ray 1020 through surface 16 and directed towards output aperture 704. Light ray 1020 exits the output aperture 704 at angle 1022. Angle 1022 is within a first angular range. Since angle 1022 is greater than the cutoff angle for bandpass filter 610, light ray 1020 is reflected back into the light recycling envelope 702 through output aperture 704. Light ray 1020 may then reflect one or more times inside light recycling envelope and may eventually exit output aperture 704 at an angle that is small enough allow passage through bandpass filter 610.

Multi-layer semiconductor structure 12 emits light ray 1030 though surface 16 and towards the inside surfaces 706 of the light recycling envelope 702. The inside surfaces 706 reflect light ray 1030 and direct light ray 1030 to output aperture 704. Light ray 1030 exits the output aperture at angle 1032. Angle 1032 is within a first angular range and is also less than the cutoff angle for bandpass filter 610. Light ray is transmitted by bandpass filter 610 and exits illumination system 1000 at angle 1034. Angle 1034 is within a second angular range. Overall, bandpass filter 610 restricts the angular range of light exiting illumination system 1000 to a second angular range, less than the first angular range.

While the invention has been described in conjunction with specific embodiments, it is evident to those skilled in the art that many alternatives, modifications and variations will be evident in light of the foregoing descriptions. Accordingly, the invention is intended to embrace all such alternatives, modifications and variations as fall within the spirit and scope of the appended claims.

What is claimed is:

1. An illumination system, comprising:
at least one light emitting diode, wherein said at least one light emitting diode has a total emitting area, wherein said at least one light emitting diode emits internally generated light and wherein said at least one light emitting diode has a reflectivity to incident light; and
a light recycling envelope that encloses said at least one light emitting diode, wherein said light recycling envelope has reflecting inside surfaces that recycle a part of said internally generated light emitted by said at least one light emitting diode back to said at least one light emitting diode;
a light output aperture in said light recycling envelope, wherein a fraction of said internally generated light emitted by said at least one light emitting diode and reflected by said light recycling envelope exits said light recycling envelope through said light output aperture, wherein the area of said light output aperture is less than said total emitting area and wherein said fraction of said internally generated light exiting said light output aperture has a first angular range; and
a partially reflecting optical element, wherein said partially reflecting optical element is located in the light optical path and proximal to said light output aperture, wherein said partially reflecting optical element transmits a first portion of said fraction of said internally generated light with a second angular range, smaller than said first angular range and wherein said partially reflecting optical element reflects a second portion of said fraction of said internally generated light back into said light recycling envelope.

2. An illumination system as in claim 1, wherein said partially reflecting optical element is at least one pyramid, wherein the base of said pyramid is proximal to said output aperture, wherein the apex of said pyramid is distal from said output aperture, wherein said first portion of said internally generated light is transmitted by refraction with said second angular range and wherein said second portion of said internally generated light undergoes total internal reflection and is directed back through said output aperture and into said light recycling envelope.

3. An illumination system as in claim 2, wherein said pyramid has four connected sides and a base.

4. An illumination system as in claim 3, wherein said partially reflecting optical element is an array of said pyramids.

5. An illumination system as in claim 1, wherein said partially reflecting optical element is a first array of prisms and a second array of prisms, wherein said second array of prisms is substantially perpendicular to said first array of prisms, wherein each said prism in said first array of prisms and each said prism in said second array of prisms has two equal sides forming an apex, said two equal sides connected to a base, wherein the bases of said first array of prisms are proximal to said output aperture, wherein the apexes of said first array of prisms are distal from said output aperture, wherein said bases of said second array of prisms are proximal to said apexes of said first array of prisms, wherein said apexes of said second array of prisms are distal from said apexes of said first array of prisms, wherein said first portion of said internally generated light is transmitted by refraction with said second angular range through said first array of prisms and said second array of prisms and wherein said second portion of said internally generated light undergoes total internal reflection by either said first array of prisms or said second array of prisms and is directed back through said output aperture and into said light recycling envelope.

6. An illumination system as in claim 1, wherein said partially reflecting optical element is a bandpass filter, wherein said bandpass filter incorporates a multi-layer dielectric coating that transmits light that has a wavelength range and that has an incident angle that is less than a cutoff angle, wherein said multi-layer dielectric coating reflects light that has said wavelength range and that has an incident angle that is greater than said cutoff angle and wherein said reflected light is reflected back through said output aperture and into said light recycling envelope.

7. An illumination system as in claim 1, wherein the output brightness of said illumination system is greater than the intrinsic brightness of said at least one light emitting diode.

8. An illumination system as in claim 1, wherein said reflectivity to said incident light is at least 70 percent.

9. An illumination system as in claim 8, wherein said reflectivity to said incident light is at least 80 percent.

10. An illumination system as in claim 9, wherein said reflectivity to said incident light is at least 90 percent.

* * * * *